(12) United States Patent
Sano et al.

(10) Patent No.: US 11,799,367 B2
(45) Date of Patent: Oct. 24, 2023

(54) ROTOR MANUFACTURING METHOD

(71) Applicant: TOYOTA JIDOSHA KABUSHIKI KAISHA, Toyota (JP)

(72) Inventors: Shinya Sano, Toyota (JP); Kensuke Komori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 9 days.

(21) Appl. No.: 17/444,476

(22) Filed: Aug. 4, 2021

(65) Prior Publication Data

US 2022/0085702 A1   Mar. 17, 2022

(30) Foreign Application Priority Data

Sep. 17, 2020 (JP) ................................. 2020-156315

(51) Int. Cl.
 *H02K 15/03* (2006.01)
(52) U.S. Cl.
 CPC ......... *H02K 15/03* (2013.01); *H02K 2215/00* (2021.08); *Y10T 29/49012* (2015.01)
(58) Field of Classification Search
 CPC ........ H02K 15/03; H02K 1/276; H02K 21/14; H02K 1/27; H02K 1/28; H02K 2201/09; H02K 1/274; H01F 7/0221; Y10T 29/49009; Y10T 29/49012; Y10T 29/53143

USPC .......... 29/598, 596, 607, 609, 729, 732, 738
See application file for complete search history.

(56) References Cited

U.S. PATENT DOCUMENTS

| | | | | |
|---|---|---|---|---|
| 10,447,123 | B2 * | 10/2019 | Amano | .................. H02K 15/03 |
| 11,201,527 | B2 * | 12/2021 | Fukuyama | .......... B29C 45/7653 |
| 2016/0111944 | A1 | 4/2016 | Ohshima et al. | |
| 2020/0099278 | A1 | 3/2020 | Fukuyama et al. | |

FOREIGN PATENT DOCUMENTS

| | | |
|---|---|---|
| JP | 2004336927 A | 11/2004 |
| JP | 2009219314 A | 9/2009 |
| JP | 2012147602 A | 8/2012 |
| JP | 5987978 B2 | 9/2016 |

\* cited by examiner

*Primary Examiner* — Thiem D Phan
(74) *Attorney, Agent, or Firm* — Hunton Andrews Kurth LLP

(57) ABSTRACT

A rotor manufacturing method is a method that allows magnetized magnets inserted in second magnet holes of a second rotor core to be inserted, while retaining magnetism, into first magnet holes of a first rotor core. This method includes a placing step of placing the second rotor core on a first end surface, in a stack thickness direction, of the first rotor core such that the second magnet holes overlap the first magnet holes, and an extruding step of extruding the magnetized magnets from the second magnet holes toward the first magnet holes using a non-magnetic jig.

13 Claims, 24 Drawing Sheets

ROTOR MANUFACTURING METHOD

CROSS-REFERENCE TO RELATED APPLICATION

This application claims priority to Japanese Patent Application No. 2020-156315 filed on Sep. 17, 2020, incorporated herein by reference in its entirety.

BACKGROUND

1. Technical Field

The present disclosure relates to a rotor manufacturing method.

2. Description of Related Art

A method of recovering permanent magnets inserted in magnet holes of a rotor core has been hitherto known.

For example, Japanese Patent Application Publication No. 2012-147602 (JP 2012-147602 A) discloses a permanent magnet manufacturing method for taking out permanent magnets that are fixed inside through-holes formed in a movable member or a fixed member. This method includes the steps of: heating the movable member or the fixed member; moving the permanent magnets from inside the through-holes to a permanent magnet holder that is made of a material containing a ferromagnetic substance; and heating the permanent magnets held by the permanent magnet holder through a magnetic attraction force to thereby demagnetize the permanent magnets.

SUMMARY

The magnet recovery method disclosed in JP 2012-147602 A allows permanent magnets having been used in a rotor core to be recovered and then reused. The problem, however, is that permanent magnets recovered by such a magnet recovery method are already demagnetized. Therefore, to be reused for another rotor core, these demagnetized permanent magnets need to be magnetized again. This complicates a manufacturing process involved in reusing permanent magnets. As a result, permanent magnets cannot be efficiently reused to manufacture a new rotor.

The present disclosure has been contrived in view of this situation, and an object of the present disclosure is to provide a rotor manufacturing method that enables reuse of magnetized magnets by allowing magnetized magnets inserted in magnet holes of one rotor core to be inserted into magnet holes of another rotor core while retaining magnetism, and that can make the manufacturing process simple and efficient by thus eliminating the need to magnetize magnets again at the time of reuse.

A rotor manufacturing method according to one aspect of the present disclosure is a method that allows magnetized magnets inserted in second magnet holes of a second rotor core to be inserted, while retaining magnetism, into first magnet holes of a first rotor core in which magnetized magnets are not inserted. This method includes a placing step of placing the second rotor core on a first end surface, in a stack thickness direction, of the first rotor core such that the second magnet holes overlap the first magnet holes, and an extruding step of extruding the magnetized magnets from the second magnet holes toward the first magnet holes using a non-magnetic jig. A stack thickness means the thickness of each rotor core in an axial direction, and the stack thickness direction means the direction of the thickness of each rotor core.

In the rotor manufacturing method of the above aspect, magnetized magnets inserted in the second magnet holes of the second rotor core placed on the first rotor core in which magnetized magnets are not inserted are extruded from the second magnet holes and inserted into the first magnet holes of the first rotor core using the non-magnetic jig. This rotor manufacturing method makes it possible to easily insert magnetized magnets having been used in the second rotor core into the first magnet holes of the first rotor core for reuse. There is no longer the need to manufacture new magnetized magnets each time a rotor is manufactured. As a result, magnet production costs can be reduced as well as over-exploitation of magnet resources can be avoided.

Further, the rotor manufacturing method of the above aspect does not involve temporarily taking the magnetized magnets from the second magnet holes of the second rotor core to the outside before inserting the magnetized magnets into the first magnet holes of the first rotor core. Thus, magnetized magnets can be prevented from becoming demagnetized by being taken to the outside. Further, the non-magnetic jig of the above aspect is made of a non-magnetic material. Thus, demagnetization of magnetized magnets that occurs when a magnetic jig is used can be avoided. As a result, magnetized magnets having been used in the second rotor core are inserted into the first rotor core while retaining magnetism. There is no longer the need to magnetize demagnetized magnets again at the time of reuse. This contributes to making the manufacturing process of the rotor manufacturing method simple and efficient In the above-described method, the non-magnetic jig may have non-magnetic guide rails. Before the extruding step is performed, the magnetized magnet in each of the second magnet holes may be attracted to a second wall of the second magnet hole and in contact with the second wall. The extruding step may include: inserting and installing the non-magnetic guide rails between the second wall and the magnetized magnet in contact with the second wall so as to keep the second wall and the magnetized magnet in the second magnet hole from coming into contact with each other; and extruding the magnetized magnet that is no longer in contact with the second wall toward the first magnet hole along the non-magnetic guide rails.

In this method, the non-magnetic guide rails are used. These non-magnetic guide rails keep the magnetized magnet and the second wall of the second magnet hole from coming into contact with each other. In this non-contact state, compared with in a direct contact state in which the magnetized magnet and the second wall of the second magnet hole are in direct contact with each other, the attraction force that the second wall of the second magnet hole exerts on the magnetized magnet is reduced. Therefore, a smaller force is required to move the magnetized magnet. Further, in the non-contact state, the magnetized magnet is in contact with only the non-magnetic guide rails. In the direct contact state, on the other hand, the magnetized magnet is in contact with the second wall of the second magnet hole. Thus, in the non-contact state, compared with in the direct contact state, the area of contact between the magnetized magnet and the surrounding structure is smaller. In the non-contact state, therefore, the magnetized magnet experiences a smaller frictional force. Accordingly, when the non-magnetic guide rails are used, a resistance force, i.e., the aforementioned attraction force and frictional force that the magnetized magnet experiences while being extruded toward the first magnet hole of the first rotor core are reduced. As a result, compared with in the direct contact state, the magnetized magnet can be extruded into the first magnet hole of the first rotor core more easily and smoothly by using the non-magnetic guide rails. In addition, the non-magnetic guide rails function to guide the moving direction of the magnetized magnet. Thus, when the non-magnetic guide rails are used, compared with when the non-magnetic guide rails are not used, the magnetized magnet can be easily and accurately inserted into the first magnet hole of the first rotor core, which contributes to increasing the workability and the efficiency of the rotor manufacturing method.

When the non-magnetic guide rails are used, the magnetized magnet and the second wall of the second magnet hole are kept from coming into contact with each other, but the magnetized magnet remains attracted to the second wall of the second magnet hole. Therefore, even in the non-contact state, unless subjected to an external force, the magnetized magnet does not fall out of the second magnet hole of the second rotor core. There is no need to separately provide a jig for preventing fall of the magnetized magnet. This contributes to making the manufacturing process of the rotor manufacturing method simple.

In the above-described method, inserting and installing the non-magnetic guide rails may include inserting the non-magnetic guide rails into the second magnet hole, or into the second magnet hole and the first magnet hole, such that leading ends of the non-magnetic guide rails on an insertion side pass through the second magnet hole and reach an opening of the first magnet hole in the first end surface or reach into the first magnet hole.

This rotor manufacturing method can easily and accurately insert magnetized magnets into the first magnet holes of the first rotor core, which contributes to increasing the workability and the efficiency of the method.

In the above-described method, in a placed state where the second rotor core is placed on the first rotor core, the first rotor core may have at least the first magnet holes that are formed at positions corresponding to positions in the second rotor core at which the second magnet holes are formed. The shape of the first magnet holes as seen in plan view may be the same as the shape of the second magnet holes as seen in plan view or larger than the shape of the second magnet holes as seen in plan view. The placing step may include placing one or more second rotor cores on the first end surface of the first rotor core such that the second magnet holes overlap the first magnet holes corresponding to the second magnet holes.

This method enables insertion of magnetized magnets not only for a first rotor core and a second rotor core that have the same configuration but also for a first rotor core and a second rotor core that have different configurations.

In the above-described method, when a plurality of second rotor cores is placed on the first rotor core in the placing step, the placing step may include stacking the second rotor cores such that the second magnet holes of the respective second rotor cores overlap one another, and thus forming a second rotor core set having second magnet hole sets that extend in a stack thickness direction. The extruding step may include inserting and installing the non-magnetic guide rails into each of the second magnet hole sets such that leading ends of the non-magnetic guide rails on an insertion side pass through the second magnet hole set and reach an opening of the first magnet hole in the first end surface or reach into the first magnet hole.

This method allows the number of the second rotor cores to be used to be arbitrarily adjusted as necessary.

In the above-described method, when a plurality of magnetized magnets needs to be inserted according to a first stack thickness of the first rotor core, the extruding step may include extruding the magnetized magnets in the second magnet holes of required ones of the second rotor cores in the second rotor core set toward the first magnet holes of the first rotor core along the non-magnetic guide rails.

This method can be applied to insertion of magnetized magnets for first rotor cores of various stack thicknesses.

In the above-described method, when the number of the second magnet holes is smaller than the number of the first magnet holes, the placing step may include: a first placing step of placing the second rotor core set on the first end surface, in a stack thickness direction, of the first rotor core such that the second magnet hole sets of the second rotor core set overlap some of the first magnet holes that correspond to the second magnet hole sets; and a second placing step of placing the second rotor core set on the first end surface, in the stack thickness direction, of the first rotor core such that the second magnet hole sets of the second rotor core set overlap others of the first magnet holes. The extruding step may include: a first extruding step of extruding a part of the magnetized magnet in each of the second magnet hole sets toward a corresponding one among some of the first magnet holes along the non-magnetic guide rails; and a second extruding step of extruding another part of the magnetized magnet in each of the second magnet hole sets toward a corresponding one among others of the first magnet holes along the non-magnetic guide rails. The first placing step, the second placing step, the first extruding step, and the second extruding step may be performed in order of the first placing step, the first extruding step, the second placing step, and the second extruding step.

This method enables insertion of magnetized magnets for rotor cores having different numbers of magnet holes.

The above-described method may further include, after extruding the magnetized magnets in the second magnet holes of the second rotor core by the extruding step to empty the second magnet holes, a first rotor core replacing step of replacing the first rotor core for which insertion of magnets has been completed with another first rotor core in which magnetized magnets are not inserted. The first rotor core replacing step may include installing the other first rotor core on a second end surface of the second rotor core such that first magnet holes of the other first rotor core overlap the second magnet holes of the second rotor core. The extruding step may be performed again after the replacing step is performed.

This method can efficiently insert magnetized magnets into the first rotor cores.

In the above-described method, the first rotor core replacing step may include: before installing the other first rotor core on the second rotor core, moving the non-magnetic guide rails in a stack thickness direction so as not to interfere with the first rotor core for which insertion of magnets has been completed, and then taking out the first rotor core; and after installing the other first rotor core on the second rotor core, moving the non-magnetic guide rails in the stack thickness direction and inserting the non-magnetic guide rails into the first magnet holes of the first rotor core.

This method allows smooth replacement of the first rotor core.

The above-described method may further include, after extruding the magnetized magnets in the second magnet holes of the second rotor core by the extruding step to empty the second magnet holes, a second rotor core replacing step of replacing the used second rotor core of which the second magnet holes have become empty with another second rotor core in which magnetized magnets are inserted. The second rotor core replacing step may include installing the other second rotor core on a first end surface side of the first rotor core such that second magnet holes of the other second rotor core overlap the first magnet holes of the first rotor core. The extruding step may be performed again after the second rotor core replacing step is performed.

This method allows efficient use of magnetized magnets in the second rotor core.

In the above-described method, the second rotor core replacing step may include: before installing the other second rotor core on the first rotor core, moving the non-magnetic guide rails in a stack thickness direction so as not to interfere with the used second rotor core, and then taking out the used second rotor core; and after installing the other second rotor core on the first rotor core, moving the non-magnetic guide rails in the stack thickness direction and inserting the non-magnetic guide rails into the second magnet holes so as to keep the magnetized magnet inserted in each of the second magnet holes of the other second rotor core and the second wall of the second magnet hole from coming into contact with each other.

This method allows smooth replacement of the second rotor core.

In the above-described method, the magnetized magnet in each of the second magnet holes may be divided into a plurality of magnet blocks in a stack thickness direction. The extruding step may include extruding, into the first magnet hole, some or all of the magnet blocks in each of the second magnet holes of the respective ones of one or more second rotor cores according to a first stack thickness of the first rotor core.

This method can handle rotor cores of various stack thicknesses.

In the above-described method, when the first stack thickness of the first rotor core is equal to a second stack thickness of the second rotor core or smaller than the second stack thickness, the extruding step may include extruding, into the first magnet hole, all or some of the magnet blocks in each of the second magnet holes of one second rotor core according to the first stack thickness.

This method has wider applicability to rotor cores of various stack thicknesses.

In the above-described method, when the first stack thickness of the first rotor core is larger than a second stack thickness of the second rotor core, the extruding step may include extruding, into the first magnet hole, all or some of the magnet blocks in each of the second magnet holes of the respective ones of a plurality of second rotor cores according to the first stack thickness.

This method allows the number of magnet blocks to be inserted to be arbitrarily adjusted according to the stack thickness of the rotor core.

The present disclosure can provide a rotor manufacturing method that enables reuse of magnetized magnets by allowing magnetized magnets inserted in magnet holes of one rotor core to be inserted into magnet holes of another rotor core while retaining magnetism, and that can make the manufacturing process simple and efficient by thus eliminating the need to magnetize magnets again at the time of reuse.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
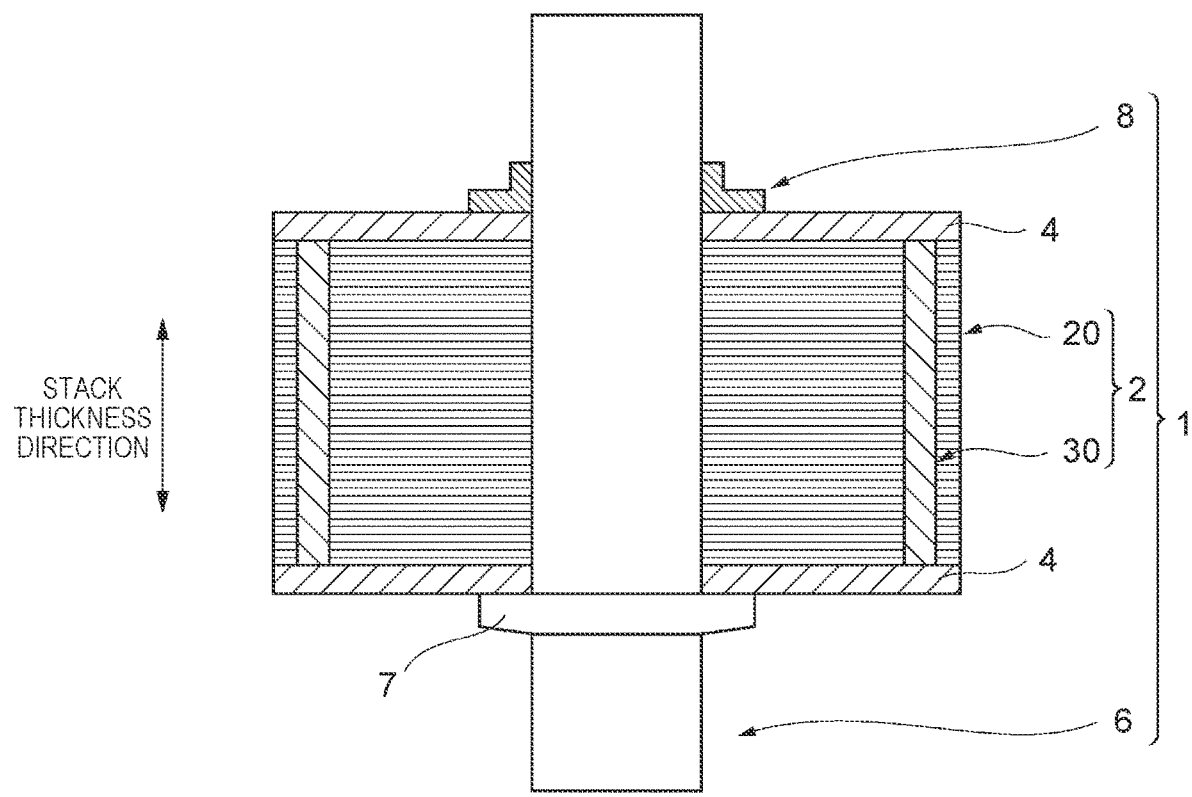
FIG. 1 is a view showing the configuration of a rotor according to a first embodiment.

Embodiments of the present disclosure will be described below. The same or similar constituent elements depicted in the drawings are denoted by the same or similar reference signs. The drawings are illustrative and the dimensions and shapes of parts are schematic. The technical scope of the present disclosure should not be interpreted based solely on the embodiments.

First Embodiment

Rotor 1

Figure 2:
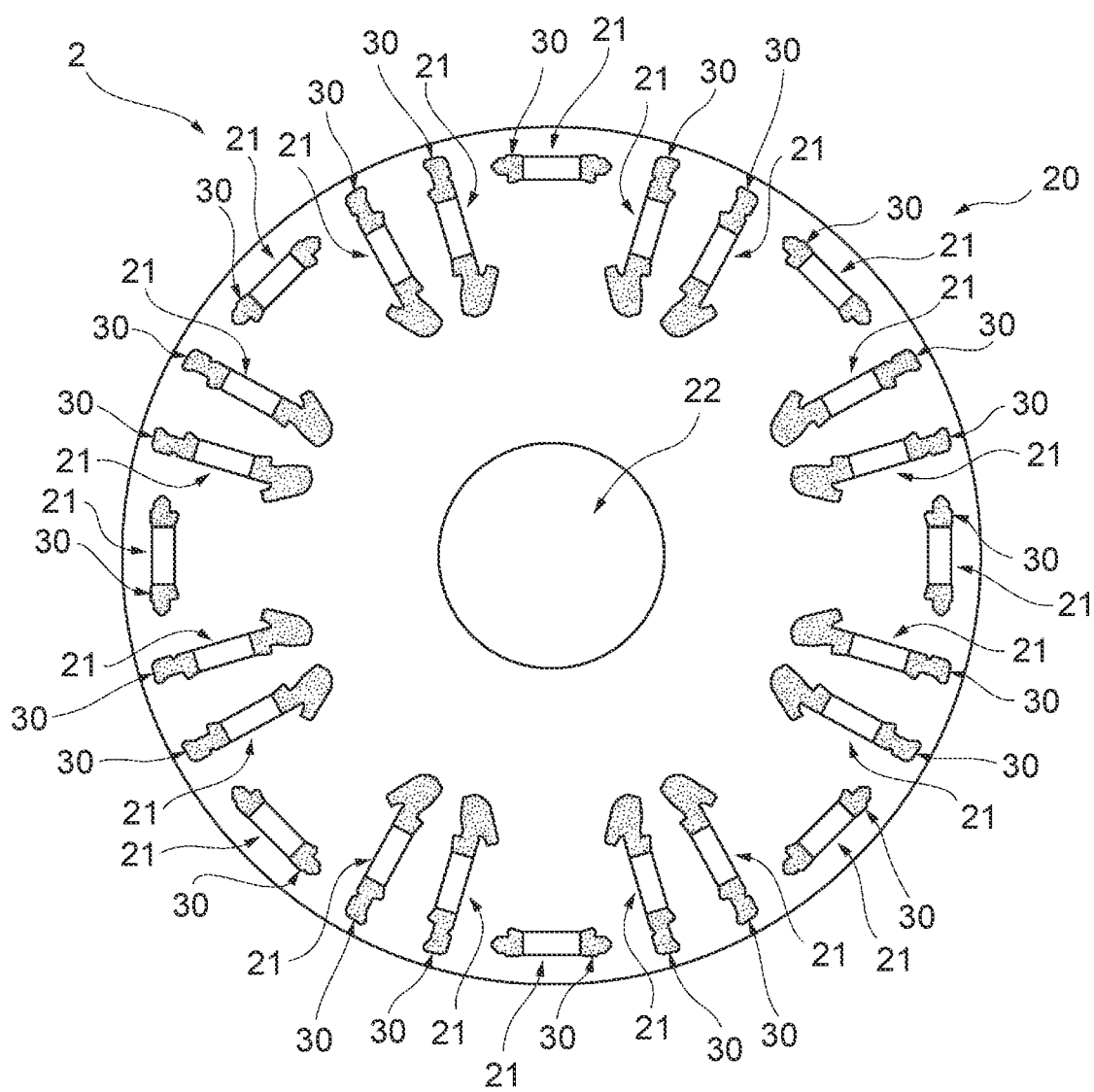
FIG. 2 is a view showing the configuration of a rotor core unit according to the first embodiment.

First, the configuration of a rotor 1 according to a first embodiment will be described with reference to FIG. 1 and FIG. 2. FIG. 1 is a view showing the configuration of the rotor 1 according to the first embodiment. FIG. 2 is a view showing the configuration of a rotor core unit 2 according to the first embodiment. For the convenience of description, the state of the rotor 1 shown in FIG. 1 may be hereinafter referred to as an "assembled state."

The rotor 1 according to the first embodiment is a rotor part of a rotating electrical machine that is used as a travel driving source or a power generator of, for example, an electric car or a hybrid vehicle. Specifically, the rotor 1 constitutes a rotating electrical machine together with a cylindrical stator (not shown) provided around the rotor 1.

As shown in FIG. 1, the rotor 1 includes a rotor core unit 2, a pair of end plates 4 that is disposed in contact with both end surfaces of the rotor core unit 2, a shaft 6 that is disposed at a central part of the rotor core unit 2, and a fixing member 8 that fixes the rotor core unit 2 and the pair of end plates 4 to the shaft 6.

As shown in FIG. 1, the rotor core unit 2 has a rotor core 20 and a plurality of magnet units 30 that is disposed so as to extend through the rotor core 20. The rotor core 20 is an annular part formed by, for example, stacking a plurality of silicon steel plates. Hereinafter, a direction in which the silicon steel plates are stacked, i.e., a direction of the thickness of the rotor core 20 will be referred to as a "stack thickness direction." As shown in FIG. 2, the magnet units 30 are disposed in a circumferential direction on a circumferential edge side of the rotor core 20. The rotor core 20 and the magnet units 30 will be described in detail later.

The pair of end plates 4 include two disc-shaped members of equal dimensions. A hole for the shaft 6 to pass through is formed at a central part of each disc-shaped member. The end plates 4 are made of a non-magnetic metal material, for example, aluminum or copper. In the assembled state, the pair of end plates 4 are welded to both end surfaces of the rotor core unit 2.

The shaft 6 is a round rod made of, for example, a steel material. The shaft 6 has a flange 7. In the assembled state, the shaft 6 is disposed so as to extend through the rotor core unit 2 and the pair of end plates 4. The flange 7 is in contact with one end plate 4 welded to the rotor core unit 2. Thus, the mounting positions of the rotor core unit 2 and the pair of end plates 4 relative to the shaft 6 are determined.

The fixing member 8 is a disc-shaped member. A hole for the shaft 6 to pass through is formed at a central part of this disc-shaped member. In the assembled state, the fixing member 8 is fixed to the shaft 6 so as to come into contact with the other end plate 4 welded to the rotor core unit 2. Thus, the rotor core unit 2 and the pair of end plates 4 are fixed to the shaft 6 by being held between the fixing member 8 and the flange 7.

Details of Rotor Core 20 and Magnet Units 30

Figure 3:
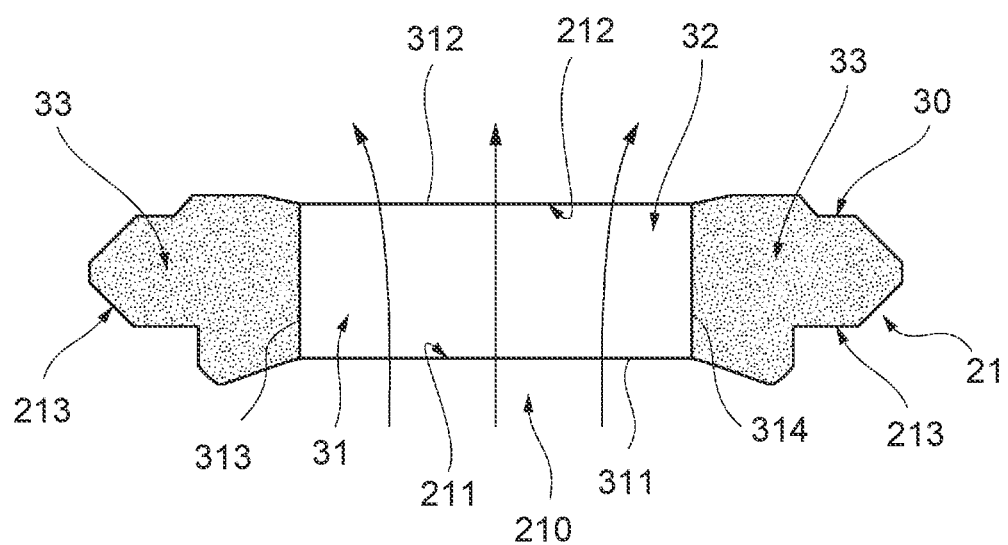
FIG. 3 is an enlarged partial view showing the configurations of a magnet hole and a magnet unit according to the first embodiment.
Figure 4:
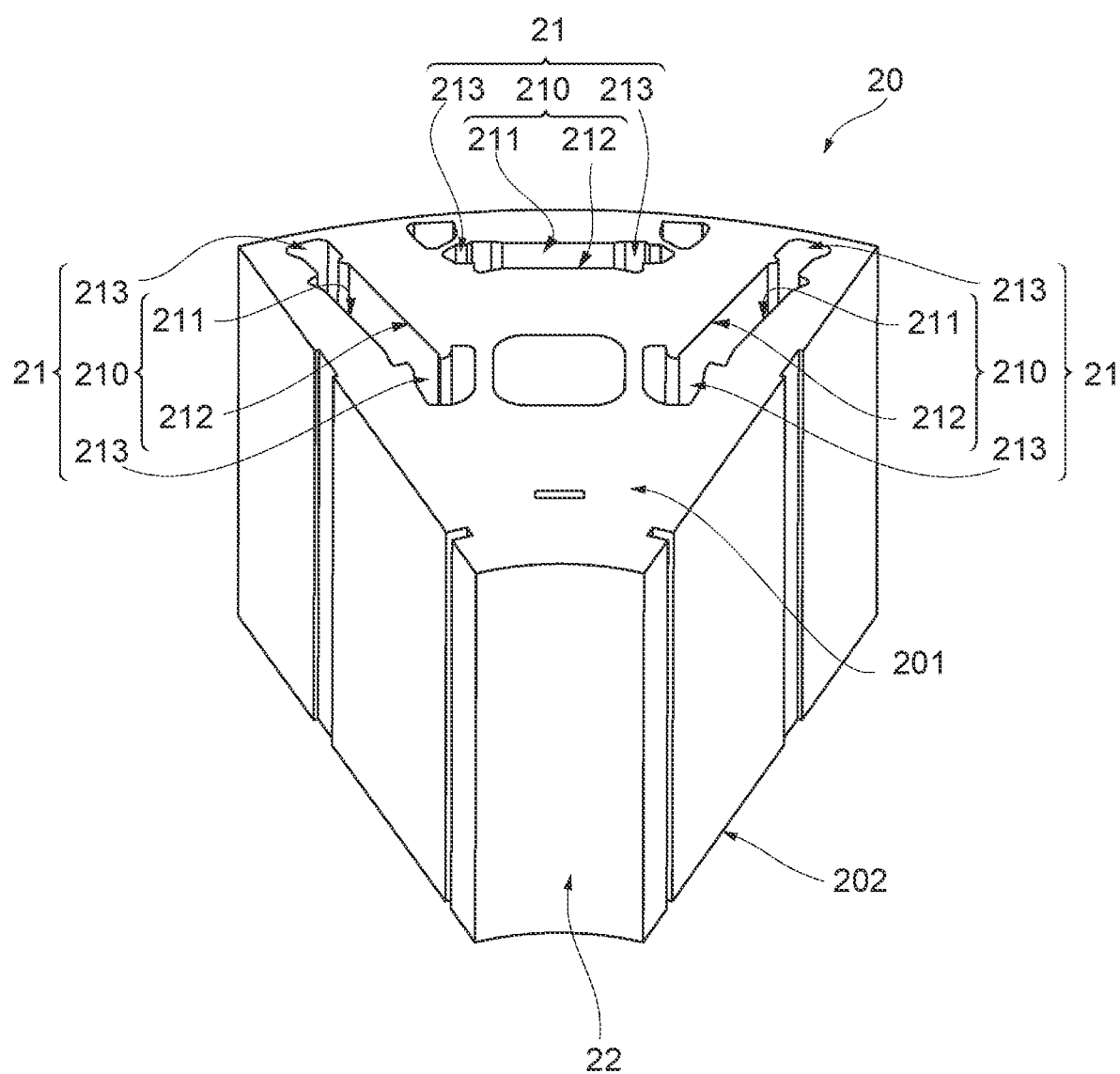
FIG. 4 is an enlarged partial view showing the configuration of a rotor core according to the first embodiment.
Figure 5:
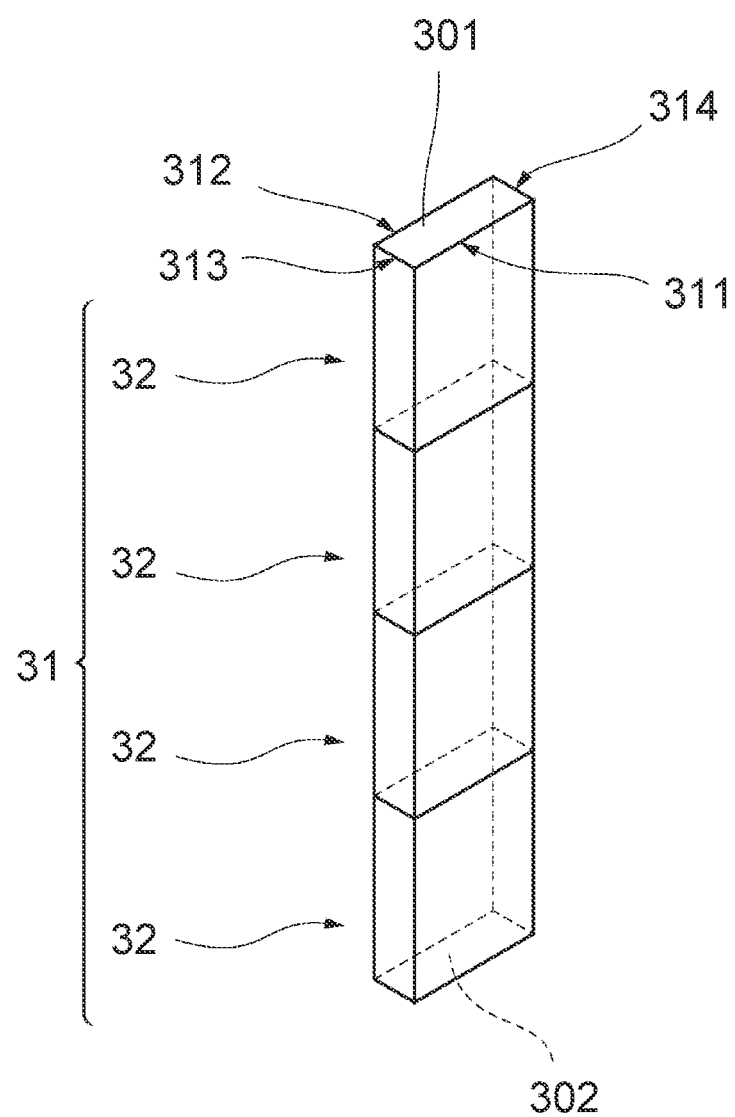
FIG. 5 is a view showing the configuration of a magnetized magnet according to the first embodiment.

Next, the configurations of the rotor core 20 and the magnet units 30 will be described in detail with reference to FIG. 1 to FIG. 5. FIG. 3 is an enlarged partial view showing the configurations of the magnet hole 21 and the magnet unit 30 according to the first embodiment. FIG. 4 is an enlarged partial view showing the configuration of the rotor core 20 according to the first embodiment. FIG. 5 is a view showing the configuration of a magnetized magnet 31 according to the first embodiment.

Rotor Core 20

As shown in FIG. 2 and FIG. 4, the rotor core 20 has a plurality of holes that is formed so as to extend through the rotor core 20 in the stack thickness direction. These holes include a plurality of magnet holes 21 that is formed each in a predetermined posture on the circumferential edge side of the rotor core 20, at intervals in the circumferential direction, and one shaft hole 22 that is formed at a central part of the rotor core 20.

The rotor core 20 has a first end surface 201 located on one side in the stack thickness direction and a second end surface 202 located on the other side in the stack thickness direction. Hereinafter, viewing the rotor core 20 in a direction toward the first end surface 201 or the second end surface 202 will be referred to as a "plan view," and a shape seen in plan view will be referred to as a "shape as seen in plan view."

As shown in FIG. 4, the shape of the magnet holes 21 as seen in plan view is a substantially rectangular shape. The magnet hole 21 has a central space 210 located at a central part of the magnet hole 21, and voids 213 that are voids in the magnet hole 21 other than the central space 210. The central space 210 and the voids 213 both extend through the rotor core 20 in the stack thickness direction.

The central space 210 is a space to dispose a magnet member (the magnetized magnet 31 to be described later) of the magnet unit 30. As shown in FIG. 4, the central space 210 has a wall 211 and a wall 212 on both sides in a width direction. As shown in FIG. 3, the wall 211 and the wall 212 are parts that come into contact with main surfaces of the magnetized magnet in a width direction thereof in the assembled state.

Each void 213 is a space to dispose a fixing member (a resin member 33 to be described later) of the magnet unit 30. As shown in FIG. 4, the voids 213 are formed one on each side of the central space 210 so as to flank the central space 210.

Magnet Unit 30

The magnet unit 30 is disposed in the magnet hole 21 of the rotor core 20 so as to fill the magnet hole 21. As shown in FIG. 3, the magnet unit 30 has the magnetized magnet 31 and the resin members 33 for fixing the position of the magnetized magnet 31.

The magnetized magnet 31 is one example of a permanent magnet. As shown in FIG. 5, the magnetized magnet 31 has an elongated shape as a whole. The magnetized magnet 31 has a plurality of magnet blocks 32. The magnet blocks 32 are arrayed to compose the magnetized magnet 31. In other words, in the assembled state, the magnetized magnet 31 is divided into the magnet blocks 32 in the stack thickness direction of the rotor core 20. Instead of being divided into the magnet blocks 32, the magnetized magnet 31 may also be one magnet.

When the magnetized magnet 31 is regarded as one part, as shown in FIG. 5, the magnetized magnet 31 has four peripheral wall surfaces of a first main surface 311, a second main surface 312, a first side surface 313, and a second side surface 314, and two end surfaces of a first end surface 301 and a second end surface 302.

In the assembled state, the first side surface 313 and the second side surface 314 are surfaces that face the voids 213 and come into contact with the resin members 33. The first main surface 311 is a surface that comes into contact with the wall 211 of the magnet hole 21, and the second main surface 312 is a surface that comes into contact with the wall 212 of the magnet hole 21. The first end surface 301 is a surface that is located on the side of the second end surface 202 of the rotor core 20, and the second end surface 302 is a surface that is located on the side of the first end surface 201 of the rotor core 20.

The first main surface 311 constitutes an S-pole of the magnetized magnet 31, and the second main surface 312 constitutes an N-pole of the magnetized magnet 31. In other words, the direction of magnetic flux lines of magnetic flux generated inside the magnetized magnet 31 is directed from the first main surface 311 toward the second main surface 312 as shown in FIG. 3.

The resin members 33 are one example of a mold material. The resin members 33 are packed into the voids 213 of the magnet hole 21 on both sides of the magnetized magnet 31 and come into contact with the first side surface 313 and the second side surface 314 of the magnetized magnet 31. Thus, when the resin members 33 solidify, the magnetized magnet 31 is completely fixed to the magnet hole 21.

Rotor Manufacturing Method

Figure 6:
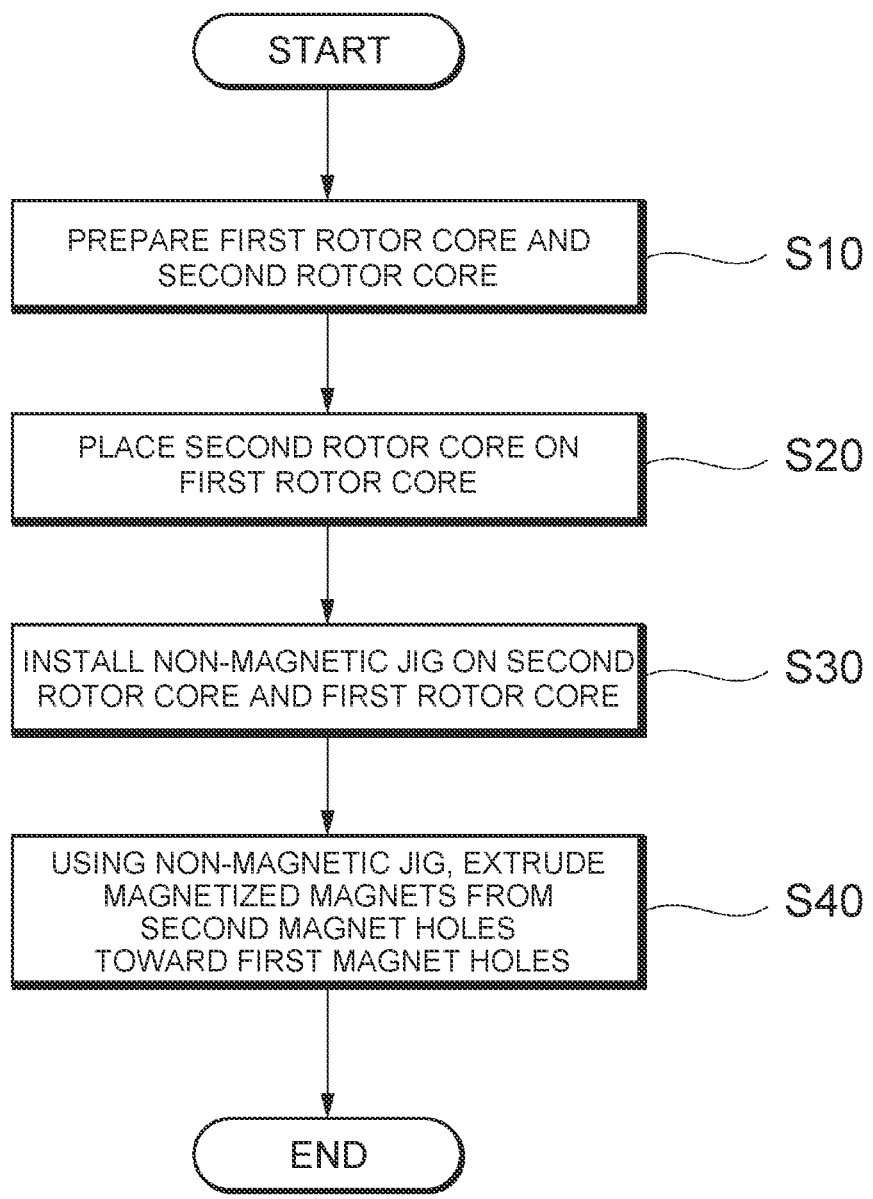
FIG. 6 is a flowchart of a rotor manufacturing method according to the first embodiment.
Figure 7:
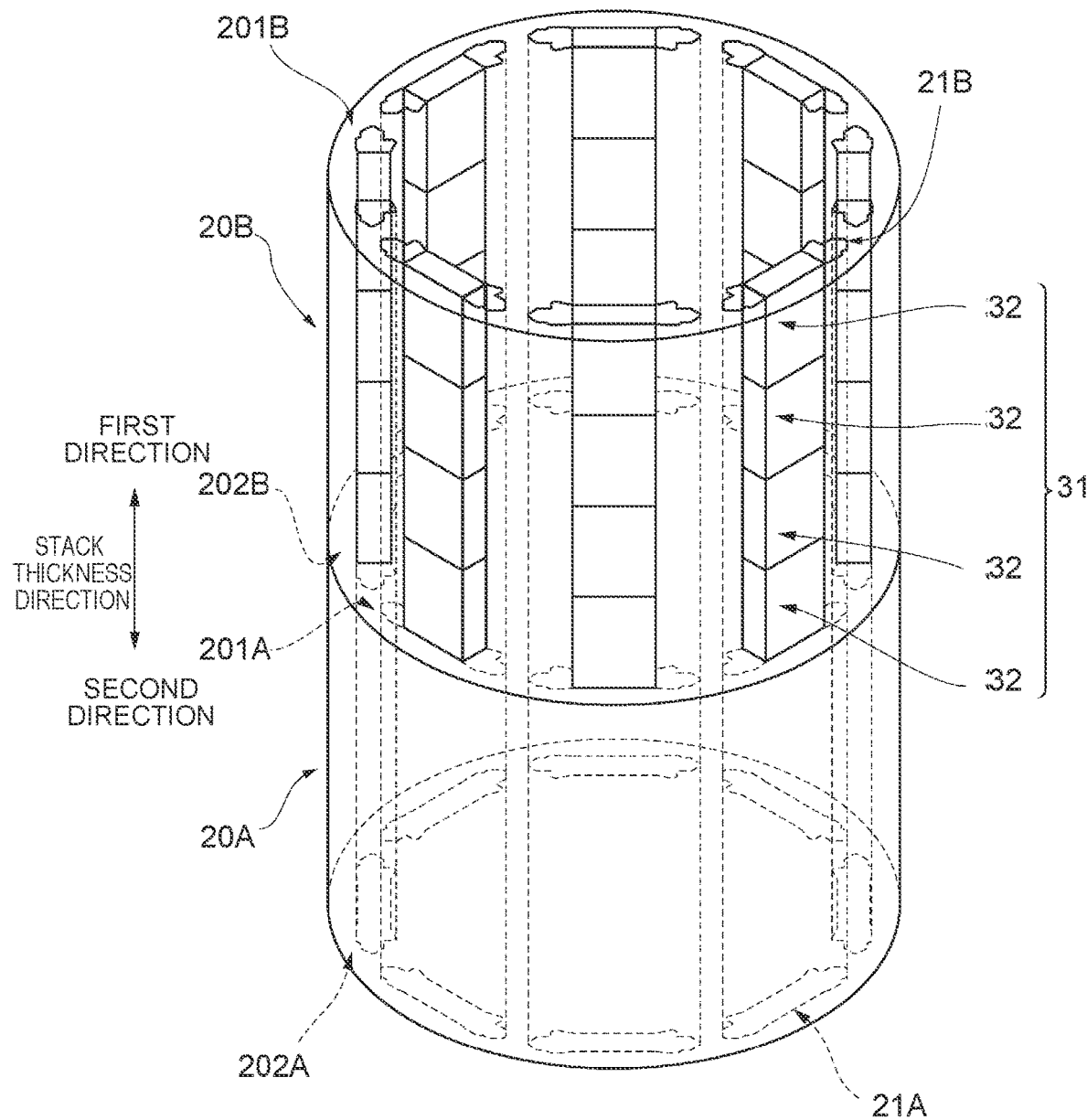
FIG. 7 is a view illustrating the rotor manufacturing method in detail in relation to step S20 of FIG. 6.
Figure 8:
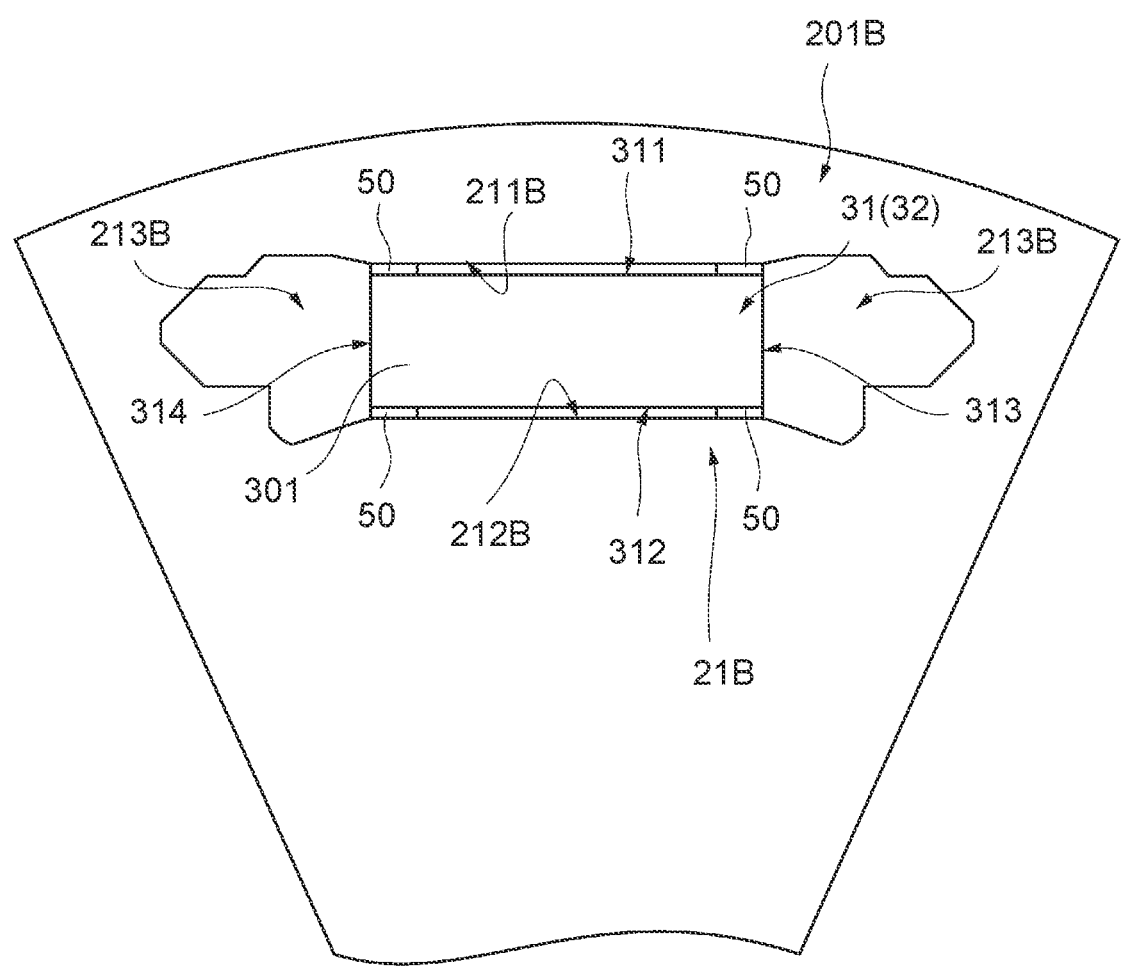
FIG. 8 is a view illustrating the rotor manufacturing method in detail in relation to step S30 of FIG. 6.
Figure 9:
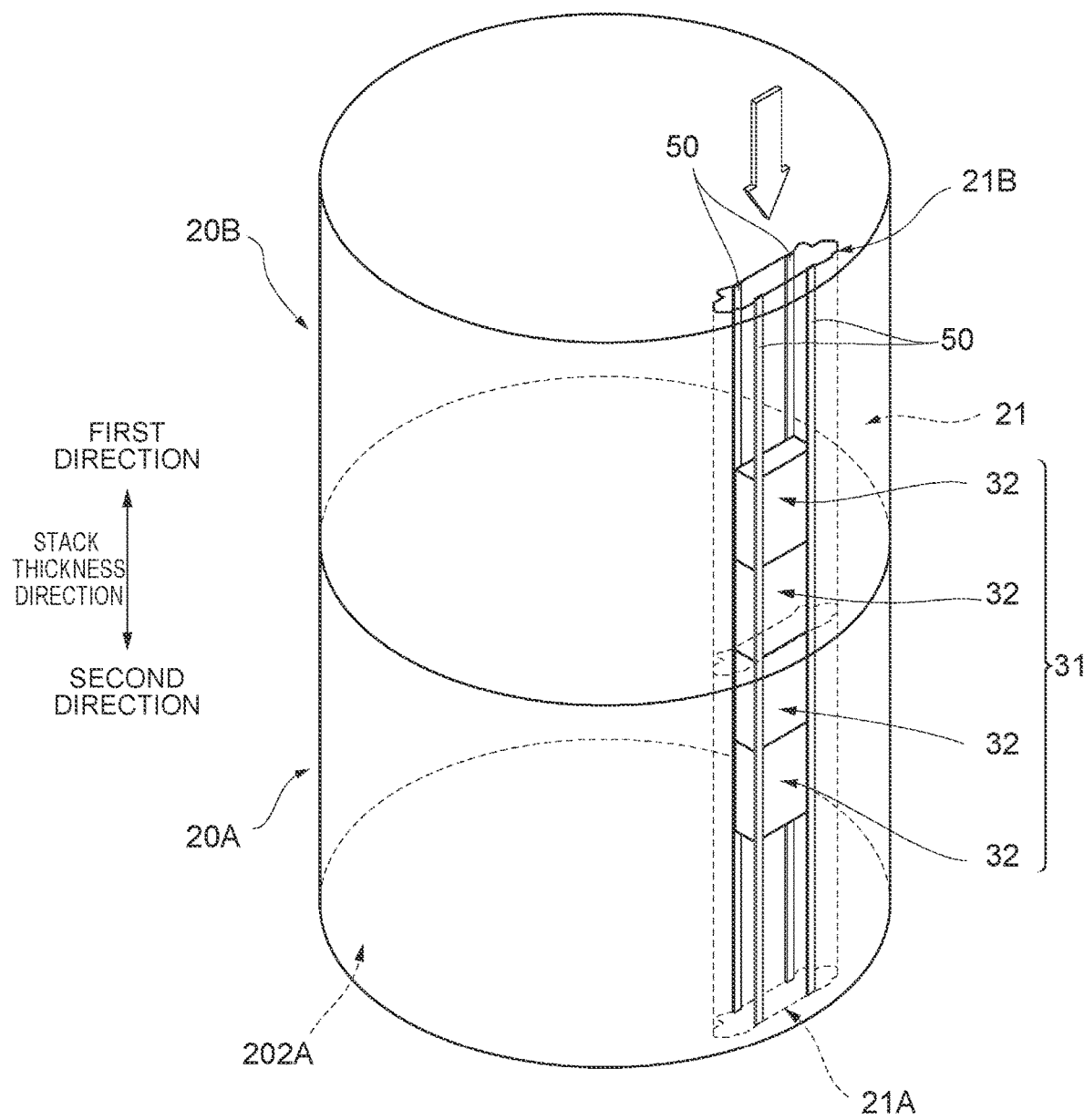
FIG. 9 is a view illustrating the rotor manufacturing method in detail in relation to step S30 and step S40 of FIG. 6.

Next, the rotor manufacturing method according to the first embodiment will be described with reference to FIG. 6 to FIG. 9. FIG. 6 is a flowchart of the rotor manufacturing method according to the first embodiment. FIG. 7 is a view illustrating step S20 of FIG. 6. FIG. 8 is a view illustrating step S30 of FIG. 6. FIG. 9 is a view illustrating step S30 and step S40 of FIG. 6. In FIG. 9, depiction of some of the magnet holes 21 and some of the magnetized magnets 31 is omitted. In FIG. 7 and FIG. 9, the magnetized magnets 31 and non-magnetic guide rails 50 are indicated by solid lines to make them easily visible.

The rotor manufacturing method according to the first embodiment is one example of a rotor manufacturing method in which, using a non-magnetic jig, magnetized magnets 31 of an old rotor core unit 2 that has been removed from the rotor 1 having been used for a rotating electrical machine are inserted, while retaining magnetism, into a new rotor core 20 into which magnetized magnets 31 need to be inserted. Hereinafter, to make a distinction, a new rotor core 20 will be referred to as a "first rotor core 20A" while an old rotor core unit 2 and the rotor core 20 of the old rotor core unit 2 will be referred to as a "second rotor core unit 2B" and a "second rotor core 20B." The same rule applies when referring to components of the first rotor core 20A and the second rotor core unit 2B.

Before the rotor manufacturing method according to the first embodiment is described in detail, the configurations of the first rotor core 20A and the second rotor core 20B and the configuration of a non-magnetic jig according to the first embodiment will be described.

First Rotor Core 20A and Second Rotor Core 20B

As shown in FIG. 7, the first rotor core 20A and the second rotor core 20B have the same configuration. Specifically, the shape, the diameter, the stack thickness, and the configuration of magnet holes of the first rotor core 20A are the same as those of the second rotor core 20B. In particular, the shape as seen in plan view, the number, the positions of formation, and the depth in the stack thickness direction of first magnet holes 21A of the first rotor core 20A are the same as those of second magnet holes 21B of the second rotor core 20B. The shape of the first magnet holes 21A as seen in plan view may be larger than the shape of the second magnet holes 21B as seen in plan view.

Thus, the number of the magnet blocks 32 of the magnetized magnet 31 to be inserted into each first magnet hole 21A of the first rotor core 20A is the same as the number of the magnet blocks 32 of the magnetized magnet 31 inserted in each second magnet hole 21B of the second rotor core 20B.

In the first embodiment, therefore, in the rotor manufacturing process, there is no need to adjust the number of the magnet blocks 32 of the magnetized magnet 31 to be extruded from each second magnet hole 21B of the second rotor core 20B into the corresponding first magnet hole 21A of the first rotor core 20A. In other words, all the magnet blocks 32 in each second magnet hole 21B of the second rotor core 20B can be inserted into the corresponding first magnet hole 21A of the first rotor core 20A.

Non-Magnetic Jig

The non-magnetic jig is a jig that allows the magnetized magnets 31 to be moved from the second magnet holes 21B of the second rotor core 20B into the first magnet holes 21A of the first rotor core 20A while retaining magnetism. The non-magnetic jig has the non-magnetic guide rails 50, and a non-magnetic extruding part and a non-magnetic adjusting part (neither of which is shown).

The non-magnetic guide rails 50 are one example of a jig that keeps the magnetized magnet 31 in each second magnet hole 21B of the second rotor core 20B and the second wall 211B of the second magnet hole 21B from coming into contact with each other. The non-magnetic guide rails 50 also function to guide the moving direction of each magnet block 32 of the magnetized magnet 31.

As shown in FIG. 9, the non-magnetic guide rails 50 are plate-shaped members. The non-magnetic guide rails 50 are made of a material that has high hardness and is less prone to elastic deformation and plastic deformation, such as stainless steel. The non-magnetic guide rails 50 are, for example, long enough to extend through both the first rotor core 20A and the second rotor core 20B in the stack thickness direction. The non-magnetic guide rails 50 may have a different length as necessary. However, it is preferable that the length of the non-magnetic guide rails 50 be at least equal to a second stack thickness of the second rotor core 20B.

In the first embodiment, the non-magnetic extruding part is provided as a component that moves in the stack thickness direction and comes into contact with the magnetized magnet 31 to thereby apply a force directed in a second direction to the magnetized magnet 31. When subjected to an external force from the non-magnetic extruding part, the magnet blocks 32 of the magnetized magnet 31 are moved in the second direction along the non-magnetic guide rails 50. Thus, the non-magnetic extruding part is a component that extrudes each magnet block 32 of the magnetized magnet 31 toward the first magnet hole 21A along the non-magnetic guide rails 50.

Further, in the first embodiment, the non-magnetic adjusting part is provided as a component that moves the non-magnetic guide rails 50 installed in the magnet hole 21 in a first direction or the second direction of the stack thickness direction to thereby adjust the positions of the non-magnetic guide rails 50 relative to the first rotor core 20A and the second rotor core 20B.

Manufacturing Steps

In the following, each step of the rotor manufacturing method will be described in detail.

First, the first rotor core 20A and the second rotor core 20B are prepared (S10).

Specifically, one first rotor core 20A in which the magnetized magnets 31 are not inserted in the first magnet holes 21A, and one second rotor core 20B in which the magnetized magnets 31 are inserted in the second magnet holes 21B are prepared.

Preparation of the second rotor core 20B will be described in more detail. First, the rotor 1 is removed from the rotating electrical machine, and the second rotor core unit 2B is taken out of the removed rotor 1. Then, using a solvent, the resin members 33 packed in each second magnet hole 21B of the second rotor core unit 2B are removed. Thus, preparation of the second rotor core 20B in which the magnetized magnets 31 are inserted has been completed.

In this case, since the resin members 33 are removed, the magnetized magnet 31 inserted in each second magnet hole 21B can be moved by an external force. On the other hand, unless subjected to an external force, the magnetized magnet 31 is attracted to the second wall 211B and the second wall 212B of the second magnet hole 21B. Thus, the magnetized magnet 31 can move freely inside the second magnet hole 21B and yet does not fall out of the second magnet hole 21B.

Next, the second rotor core 20B is placed on the first rotor core 20A (S20).

Step S20 is one example of a placing step. Specifically, as shown in FIG. 7, the second rotor core 20B is placed on the first end surface 201A, in the stack thickness direction, of the first rotor core 20A such that the second magnet holes 21B of the second rotor core 20B respectively overlap the corresponding first magnet holes 21A of the first rotor core 20A. Thus, the first wall 211A and the first wall 212A of each first magnet hole 21A are joined to the corresponding second wall 211B and second wall 212B of the second rotor core 20B and form common planes.

Hereinafter, the first magnet hole 21A and the second magnet hole 21B overlapping each other may be collectively referred to as a "magnet hole 21." The first wall 211A and the second wall 211B, and the first wall 212A and the second wall 212B, forming common planes may be collectively referred to as a "wall 211" and a "wall 212," respectively.

Subsequently, the non-magnetic jig is installed on the second rotor core 20B and the first rotor core 20A (S30).

Specifically, as shown in FIG. 8 and FIG. 9, four non-magnetic guide rails 50 are inserted into each magnet hole 21 (i.e., each first magnet hole 21A and the second magnet hole 21B overlapping it) of the first rotor core 20A and the second rotor core 20B placed thereon, so as to extend through the magnet hole 21.

More specifically, as shown in FIG. 8, for each magnet hole 21, two of the four non-magnetic guide rails 50 are inserted between the first main surface 311 of the magnetized magnet 31 and the second wall 211B, while the other two are inserted between the second main surface 312 of the magnetized magnet 31 and the second wall 212B. In this case, as shown in FIG. 9, the non-magnetic guide rails 50 inserted in each magnet hole 21 are installed in the second rotor core 20B and the first rotor core 20A such that leading ends thereof on an insertion side pass through the second magnet hole 21B and reach an opening of the first magnet hole 21A in the second end surface 202A.

Thus, as shown in FIG. 8, the magnetized magnet 31 in each second magnet hole 21B is kept from coming into contact with the second wall 211B and the second wall 212B of the second magnet hole 21B by the non-magnetic guide rails 50 installed therein. In this non-contact state, compared with in a direct contact state, the distance from the first main surface 311 of the magnetized magnet 31 to the second wall 211B and the distance from the second main surface 312 of the magnetized magnet 31 to the second wall 212B are longer. Therefore, compared with in the direct contact state, the attraction force that the second wall 211B and the second wall 212B exert on the magnetized magnet 31 is reduced.

On the other hand, in the non-contact state, the second wall 211B and the second wall 212B keep attracting the magnetized magnet 31 with the reduced attraction force.

Therefore, even in the non-contact state, unless subjected to an external force, the magnetized magnet 31 does not fall out of the second magnet hole 21B into the first magnet hole 21A.

In this case, the non-magnetic extruding part and the non-magnetic adjusting part are disposed, for example, on the side of the first end surface 201B of the second rotor core 20B.

Next, using the non-magnetic jig, the magnetized magnets 31 are extruded from the second magnet holes 21B toward the first magnet holes 21A (S40).

Step S40 is one example of an extruding step. Specifically, the non-magnetic extruding part moves so as to come into contact with the first end surface 301 of the magnetized magnet 31 and applies an external force directed in the second direction of the stack thickness direction to the magnetized magnet 31. Thus, under the external force from the non-magnetic extruding part, each magnet block 32 of the magnetized magnet 31 moves along the non-magnetic guide rails 50. Then, as shown in FIG. 9, the magnet blocks 32 of the magnetized magnet 31 are sequentially inserted into the first magnet hole 21A of the first rotor core 20A.

After the magnetized magnet 31, i.e., all the magnet blocks 32 having been inserted in each second magnet hole 21B of the second rotor core 20B are inserted into the corresponding first magnet hole 21A of the first rotor core 20A, the non-magnetic adjusting part moves the non-magnetic guide rails 50 in the first direction of the stack thickness direction so as not to interfere with the first rotor core 20A.

Thus, each magnet block 32 of the magnetized magnet 31 comes into contact with the first wall 211A and the first wall 212A of the first rotor core 20A. As a result, each magnet block 32 of the magnetized magnet 31 is attracted to the first wall 211A and the first wall 212A and fixed in the first magnet hole 21A of the first rotor core 20A.

Thereafter, the first rotor core 20A into which the magnetized magnets 31 have been inserted is taken out of the non-magnetic jig, which completes insertion of magnets for the first rotor core 20A.

Advantages of Rotor Manufacturing Method

As has been described, in the rotor manufacturing method according to the first embodiment, using the non-magnetic jig, the magnetized magnets 31 inserted in the second magnet holes 21B of the second rotor core 20B placed on the first rotor core 20A are extruded from the second magnet holes 21B and inserted into the first magnet holes 21A of the first rotor core 20A in which magnetized magnets 31 are not inserted. This rotor manufacturing method makes it possible to easily insert the magnetized magnets 31 having been used in the old rotor core 20 into the magnet holes 21 of another rotor core 20 for reuse. There is no longer the need to manufacture new magnetized magnets each time a rotor is manufactured. As a result, magnet production costs can be reduced as well as over-exploitation of magnet resource can be avoided.

The rotor manufacturing method according to the first embodiment does not involve temporarily taking the magnetized magnets 31 from the second magnet holes 21B of the second rotor core 20B to the outside before inserting the magnetized magnets 31 into the first magnet holes 21A of the first rotor core 20A. Thus, the magnetized magnets 31 can be prevented from becoming demagnetized by being taken to the outside. Further, the non-magnetic jig according to the first embodiment is made of a non-magnetic material. Thus, demagnetization of the magnetized magnets 31 that occurs when a magnetic jig is used can be avoided. As a result, the magnetized magnets 31 having been used in the old rotor core 20 are inserted into another rotor core 20 while retaining magnetism. There is no longer the need to magnetize the demagnetized magnets 31 again at the time of reuse. This contributes to making the manufacturing process of the rotor manufacturing method simple and efficient.

The non-magnetic jig according to the first embodiment employs the non-magnetic guide rails 50. The non-magnetic guide rails 50 keep each magnetized magnet 31 and the walls 211, 212 of the magnet hole 21 from coming into contact with each other. In this non-contact state, compared with in a direct contact state in which the magnetized magnet 31 and the walls 211, 212 of the magnet hole 21 are in direct contact with each other, the attraction force that the wall 211 and the wall 212 of the magnet hole 21 exert on the magnetized magnet 31 is reduced. Therefore, a smaller force is required to move the magnetized magnet 31. Further, in the non-contact state, the magnetized magnet 31 is in contact with only the non-magnetic guide rails 50. In the direct contact state, on the other hand, the magnetized magnet 31 is in contact with the wall 211 and the wall 212 of the magnet hole 21. Thus, in the non-contact state, compared with in the direct contact state, the area of contact between the magnetized magnet 31 and the surrounding structure is smaller. Therefore, the magnetized magnet 31 experiences a smaller frictional force. Accordingly, when the non-magnetic guide rails 50 are used, a resistance force, i.e., the aforementioned attraction force and frictional force that the magnetized magnet 31 experiences while being extruded toward the first magnet hole 21A of the first rotor core 20A are reduced. As a result, compared with in the direct contact state, the magnetized magnet 31 can be extruded into the first magnet hole 21A of the first rotor core 20A more easily and smoothly by using the non-magnetic guide rails 50.

Moreover, the non-magnetic guide rails 50 function to guide the moving direction of the magnetized magnet 31. Thus, when the non-magnetic guide rails 50 are used, compared with when the non-magnetic guide rails 50 are not used, the magnetized magnet 31 can be easily and accurately inserted into the first magnet hole 21A of the first rotor core 20A, which contributes to increasing the workability and the efficiency of the rotor manufacturing method.

When the non-magnetic guide rails 50 are used, the magnetized magnet 31 and the walls 211, 212 of the magnet hole 21 are kept from coming into contact with each other, but the magnetized magnet 31 remains attracted by the walls 211, 212 of the magnet hole 21. Therefore, even in the non-contact state, unless subjected to an external force, the magnetized magnet 31 does not fall out of the second magnet hole 21B of the second rotor core 20B. There is no need to separately provide a jig for preventing fall of the magnetized magnet 31. This contributes to making the manufacturing process of the rotor manufacturing method simple. The magnetized magnet 31 according to the first embodiment is divided into the magnet blocks 32 in a longitudinal direction. Thus, the number of the magnet blocks 32 to be inserted into each first magnet hole 21A of the first rotor core 20A can be arbitrarily adjusted as necessary.

As has been described above, the rotor manufacturing method according to the first embodiment enables reuse of the magnetized magnets 31 by allowing the magnetized magnets 31 inserted in the second magnet holes 21B of the second rotor core 20B to be inserted into the first magnet holes 21A of the first rotor core 20A while retaining magnetism, and makes the manufacturing process simple and efficient by thus eliminating the need to magnetize the magnetized magnets 31 again at the time of reuse.

Second Embodiment

Figure 10:
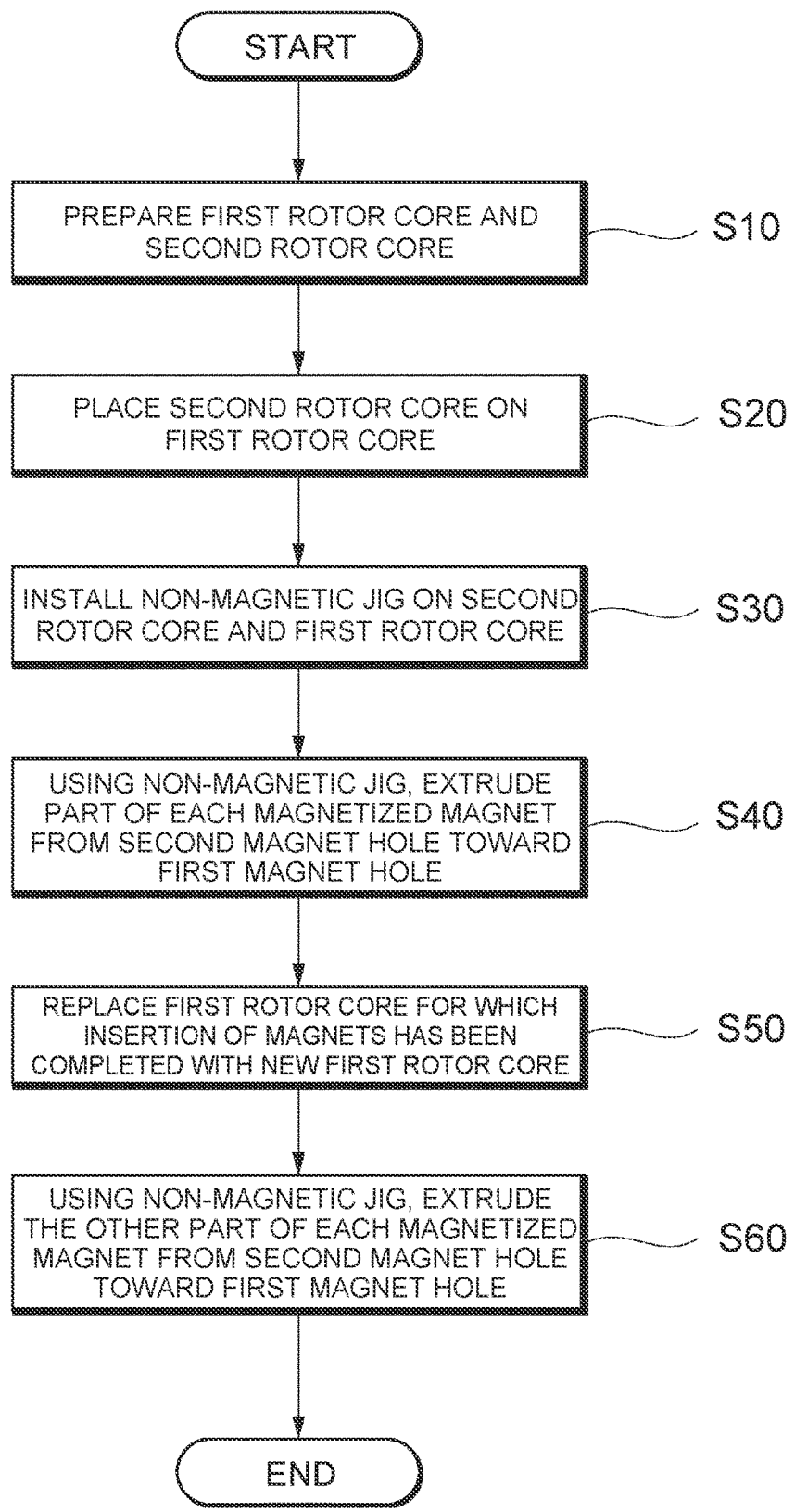
FIG. 10 is a flowchart of a rotor manufacturing method according to a second embodiment.
Figure 11:
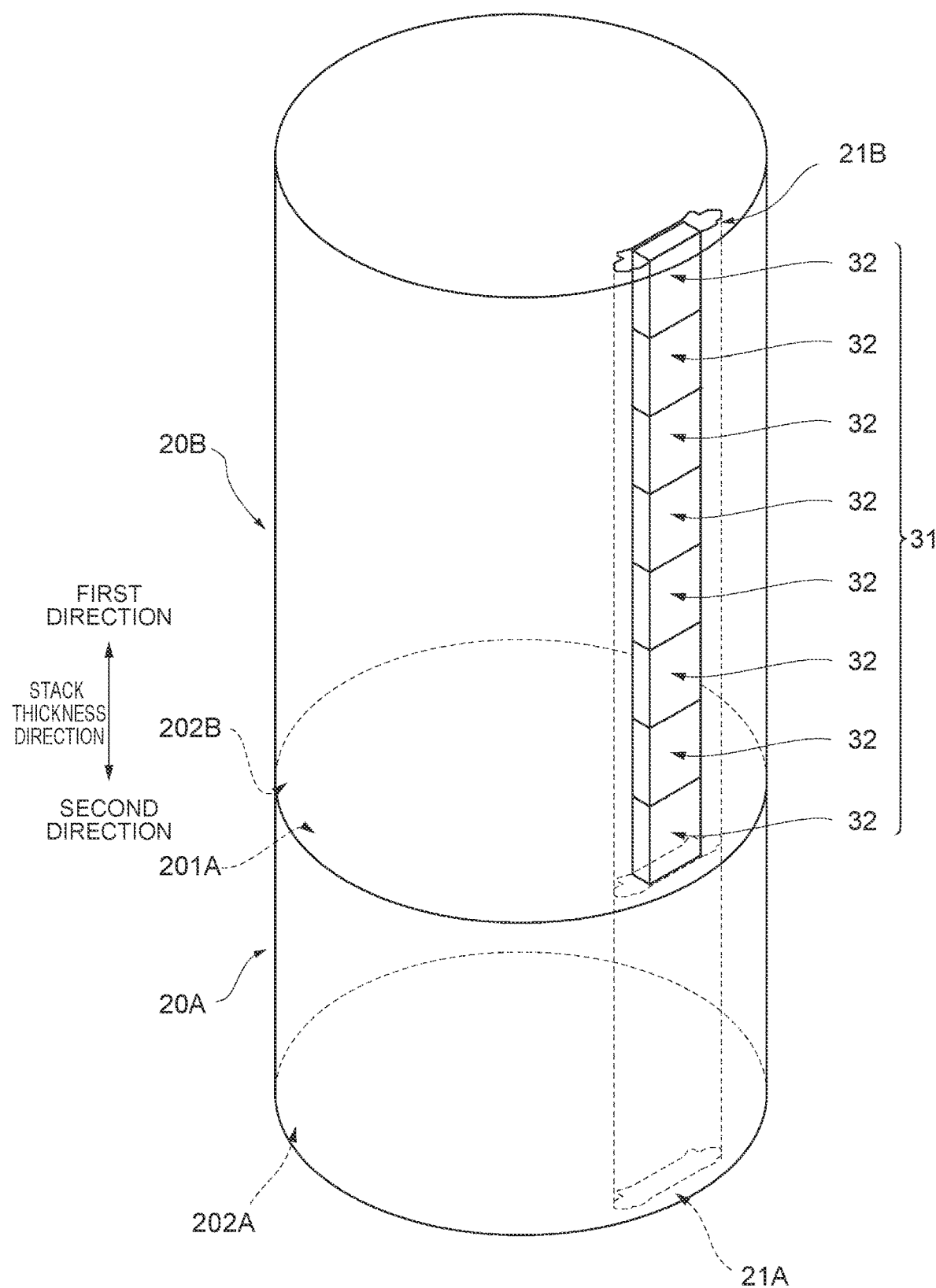
FIG. 11 is a view illustrating the rotor manufacturing method in detail in relation to step S20 of FIG. 10.
Figure 12:
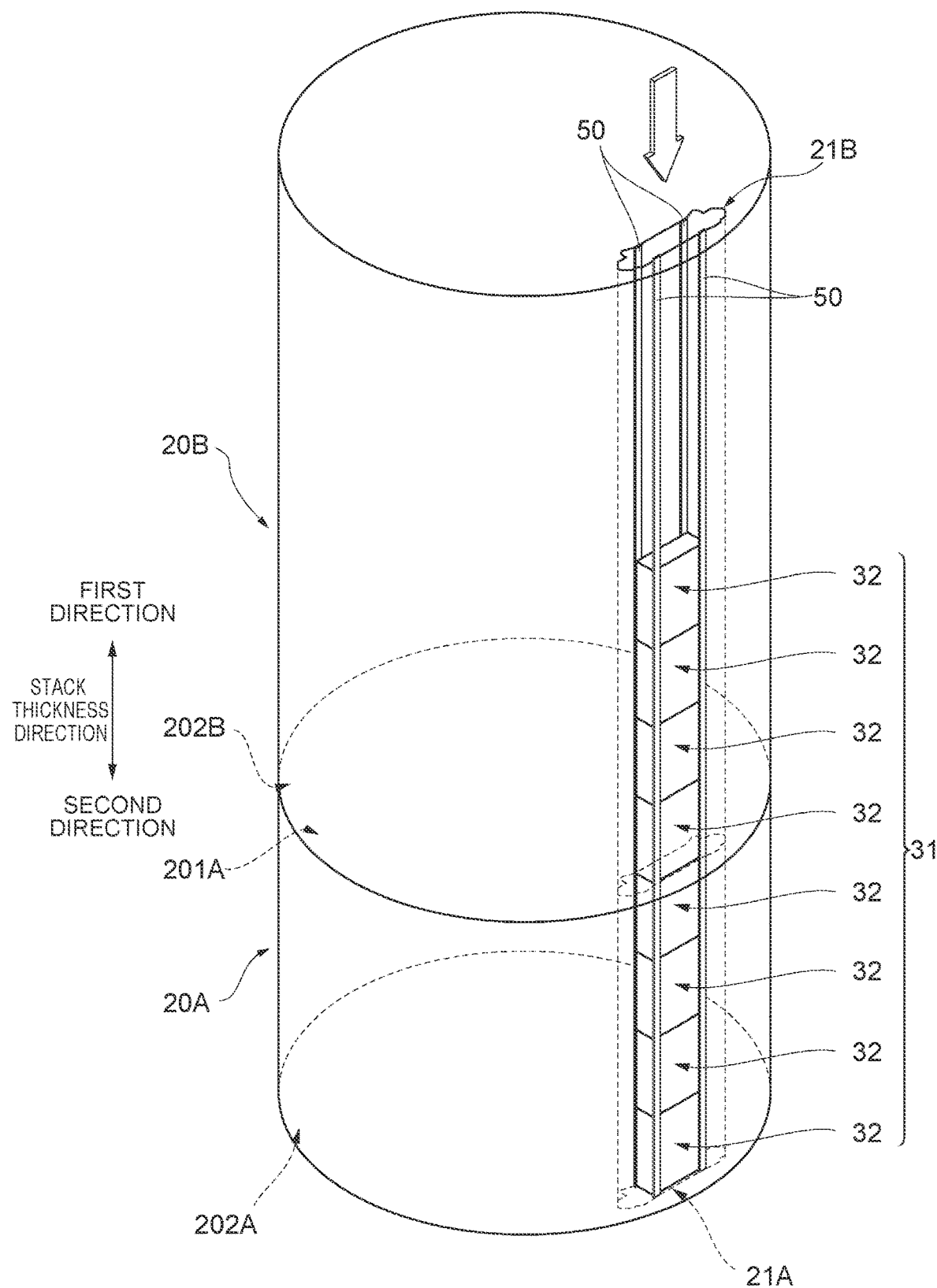
FIG. 12 is a view illustrating the rotor manufacturing method in detail in relation to step S30 of FIG. 10.
Figure 13:
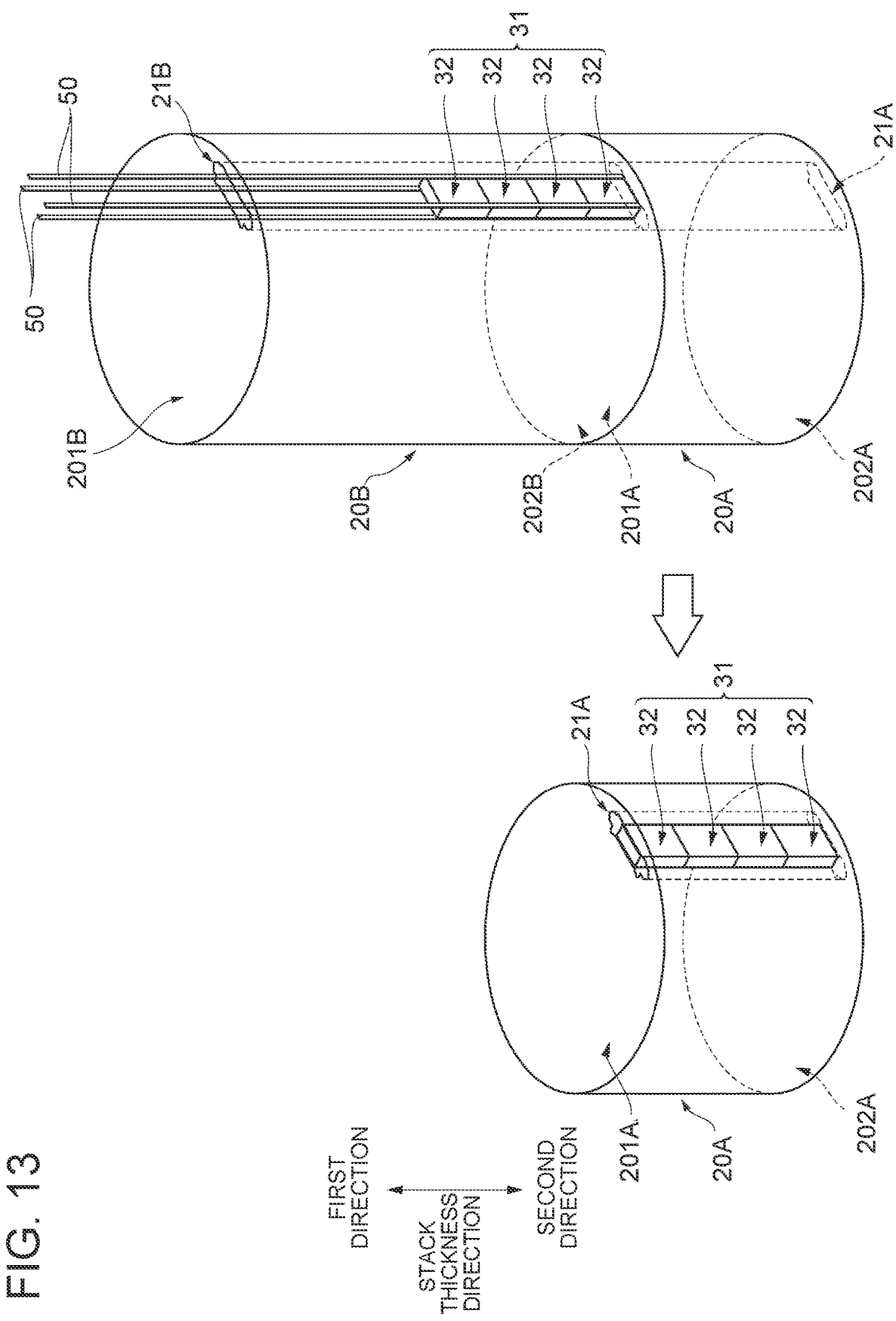
FIG. 13 is a view illustrating the rotor manufacturing method in detail in relation to step S40 of FIG. 10.
Figure 14:
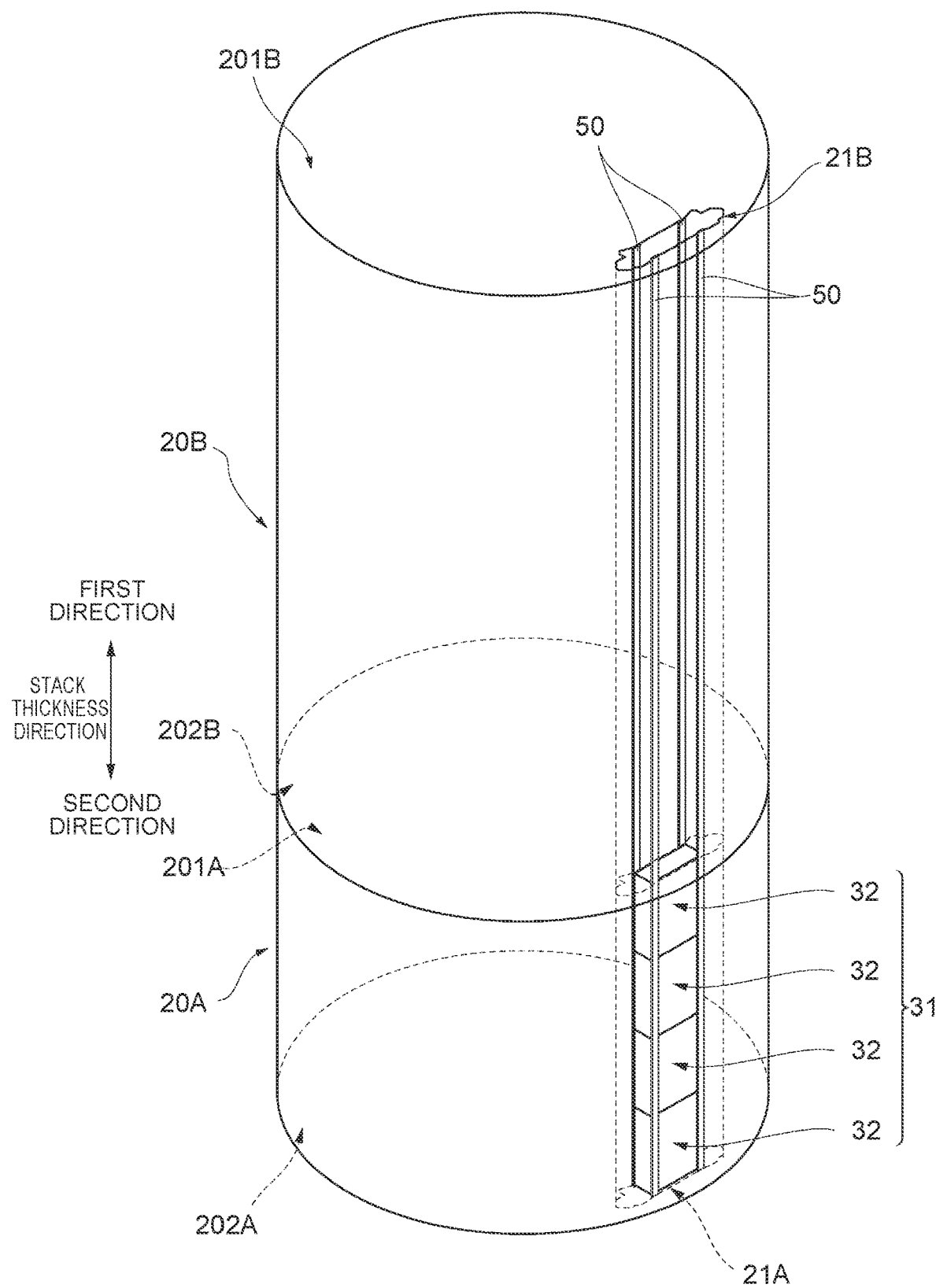
FIG. 14 is a view illustrating the rotor manufacturing method in detail in relation to step S50 of FIG. 10.

Next, a rotor manufacturing method according to a second embodiment will be described with reference to FIG. 10 to FIG. 14. FIG. 10 is a flowchart of the rotor manufacturing method according to the second embodiment. FIG. 11 is a view illustrating step S20 of FIG. 10. FIG. 12 is a view illustrating step S30 of FIG. 10. FIG. 13 is a view illustrating step S40 of FIG. 10. FIG. 14 is a view illustrating step S50 of FIG. 10. In FIG. 11 to FIG. 14, depiction of some of the magnet holes 21 and some of the magnetized magnets 31 is omitted. Further, in FIG. 11 to FIG. 14, the magnetized magnets 31 and the non-magnetic guide rails 50 are indicated by solid lines to make them easily visible.

In the following description, the description of matters that the second embodiment has in common with the first embodiment will be omitted and contents relating to differences between these embodiments will be described. In particular, the same workings and effects of the same configurations will not be mentioned. The same applies to the description of a third embodiment and a fourth embodiment that will follow.

First Rotor Core 20A and Second Rotor Core 20B

As shown in FIG. 11, the second stack thickness of the second rotor core 20B according to the second embodiment is twice the second stack thickness of the second rotor core 20B according to the first embodiment. Except for the second stack thickness, the configuration of the second rotor core 20B according to the second embodiment is the same as that of the second rotor core 20B according to the first embodiment. The configuration of the first rotor core 20A according to the second embodiment is the same as that of the first rotor core 20A according to the first embodiment.

Thus, in the second embodiment, the second stack thickness of the second rotor core 20B is twice the first stack thickness of the first rotor core 20A. Therefore, the number of the magnet blocks 32 of the magnetized magnet 31 inserted in each second magnet hole 21B of the second rotor core 20B is twice the number of the magnet blocks 32 required for each first magnet hole 21A of the first rotor core 20A.

Rotor Manufacturing Method

As shown in FIG. 10 to FIG. 12, step S10 to step S30 of the rotor manufacturing method according to the second embodiment are the same as step S10 to step S30 of the rotor manufacturing method according to the first embodiment, and therefore the description of these steps will be omitted. In the following, step S40 to step S60 of the rotor manufacturing method according to the second embodiment will be described.

After step S10 to step S30 are performed, a part of each magnetized magnet 31 is extruded from the second magnet hole 21B toward the first magnet hole 21A using the non-magnetic jig (S40).

Specifically, as shown in FIG. 12, the non-magnetic extruding part inserts half of the magnet blocks 32 composing the magnetized magnet 31 into the first magnet hole 21A of the first rotor core 20A along the non-magnetic guide rails 50. The insertion method of the magnet blocks 32 of the magnetized magnet 31 is the same as that in step S40 according to the first embodiment, and therefore the description thereof will be omitted.

Next, the first rotor core 20A for which insertion of magnets has been completed is replaced with a new first rotor core 20A (S50).

Step S50 is one example of a first rotor core replacing step. Specifically, as shown in FIG. 13, the non-magnetic adjusting part moves the non-magnetic guide rails 50 in the first direction of the stack thickness direction so as not to interfere with the first rotor core 20A. Then, the first rotor core 20A for which insertion of magnets has been completed can be taken out of the non-magnetic jig.

After the first rotor core 20A for which insertion of magnets has been completed is taken out, a new first rotor core 20A in which magnet blocks 32 are not inserted is disposed on the side of the second end surface 202B of the second rotor core 20B such that the first magnet holes 21A of the new first rotor core 20A overlap the second magnet holes 21B of the second rotor core 20B.

After the first rotor core 20A is replaced with the new one, as shown in FIG. 14, the non-magnetic adjusting part inserts and installs the non-magnetic guide rails 50 into each first magnet hole 21A of the first rotor core 20A such that the leading ends of the non-magnetic guide rails 50 on the insertion side reach the opening of the first magnet hole 21A in the second end surface 202A.

Subsequently, using the non-magnetic jig, another part of each magnetized magnet 31 is extruded from the second magnet hole 21B toward the first magnet hole 21A (S60).

Specifically, as shown in FIG. 14, the non-magnetic extruding part inserts the other half of the magnet blocks 32 composing each magnetized magnet 31 into the first magnet hole 21A of the first rotor core 20A having replaced the old first rotor core 20A, along the non-magnetic guide rails 50. The insertion method of the magnet blocks 32 of the magnetized magnet 31 is the same as that in step S40 of the first embodiment, and therefore the description thereof will be omitted.

After the other half of the magnet blocks 32 in each second magnet hole 21B of the second rotor core 20B is inserted into the corresponding first magnet hole 21A of the first rotor core 20A, the non-magnetic adjusting part moves the non-magnetic guide rails 50 in the first direction of the stack thickness direction so as not to interfere with the first rotor core 20A.

Thereafter, the first rotor core 20A into which the needed magnet blocks 32 have been inserted is taken out of the non-magnetic jig, which completes insertion of magnets for the first rotor core 20A.

Advantages of Rotor Manufacturing Method

The rotor manufacturing method according to the second embodiment can offer the same advantages as the first embodiment, as well as can handle a first rotor core 20A and a second rotor core 20B that have different stack thicknesses. Thus, the rotor manufacturing method according to the second embodiment can be used for manufacture involving insertion of magnets into rotor cores of various stack thicknesses. This contributes to expanding the range of applications of the rotor manufacturing method according to the second embodiment.

For one second rotor core 20B, the first rotor core 20A for which insertion of magnets has been completed is replaced with a new first rotor core 20A, and thus the magnetized magnets 31 in the second rotor core 20B can be more efficiently reused. This contributes to increasing the manufacturing efficiency of the rotor manufacturing method according to the second embodiment.

Even when the first rotor core 20A is replaced, the magnetized magnets 31 are held in the second rotor core 20B while retaining magnetism. Thus, replacing the first rotor core 20A does not result in demagnetization of the magnetized magnets 31. In this case, the non-magnetic guide rails 50 of the non-magnetic jig are left installed in the second rotor core 20B. These non-magnetic guide rails 50 help position the new first rotor core 20A relatively to the second rotor core 20B.

Third Embodiment

Figure 15:
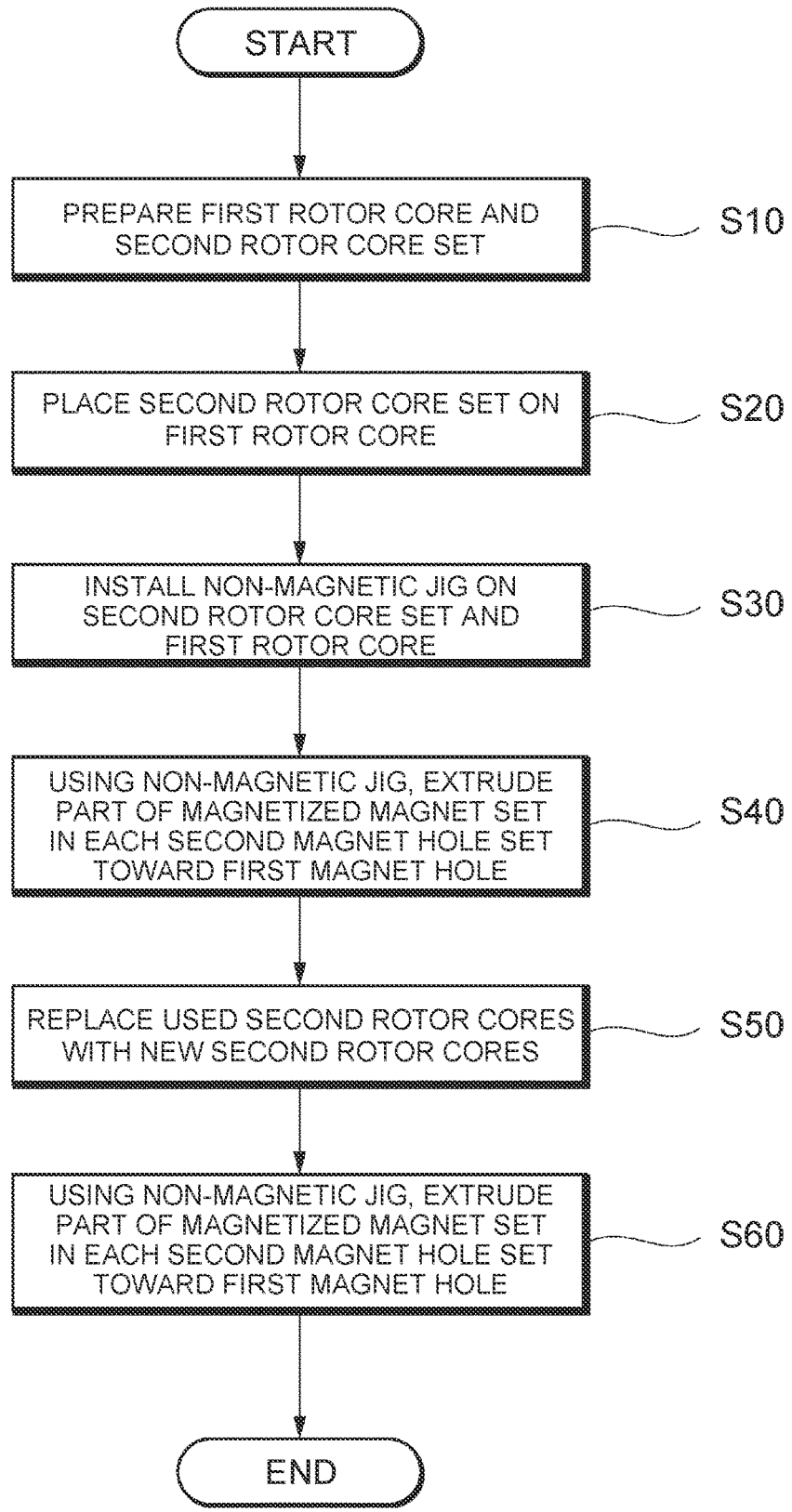
FIG. 15 is a flowchart of a rotor manufacturing method according to a third embodiment.
Figure 16:
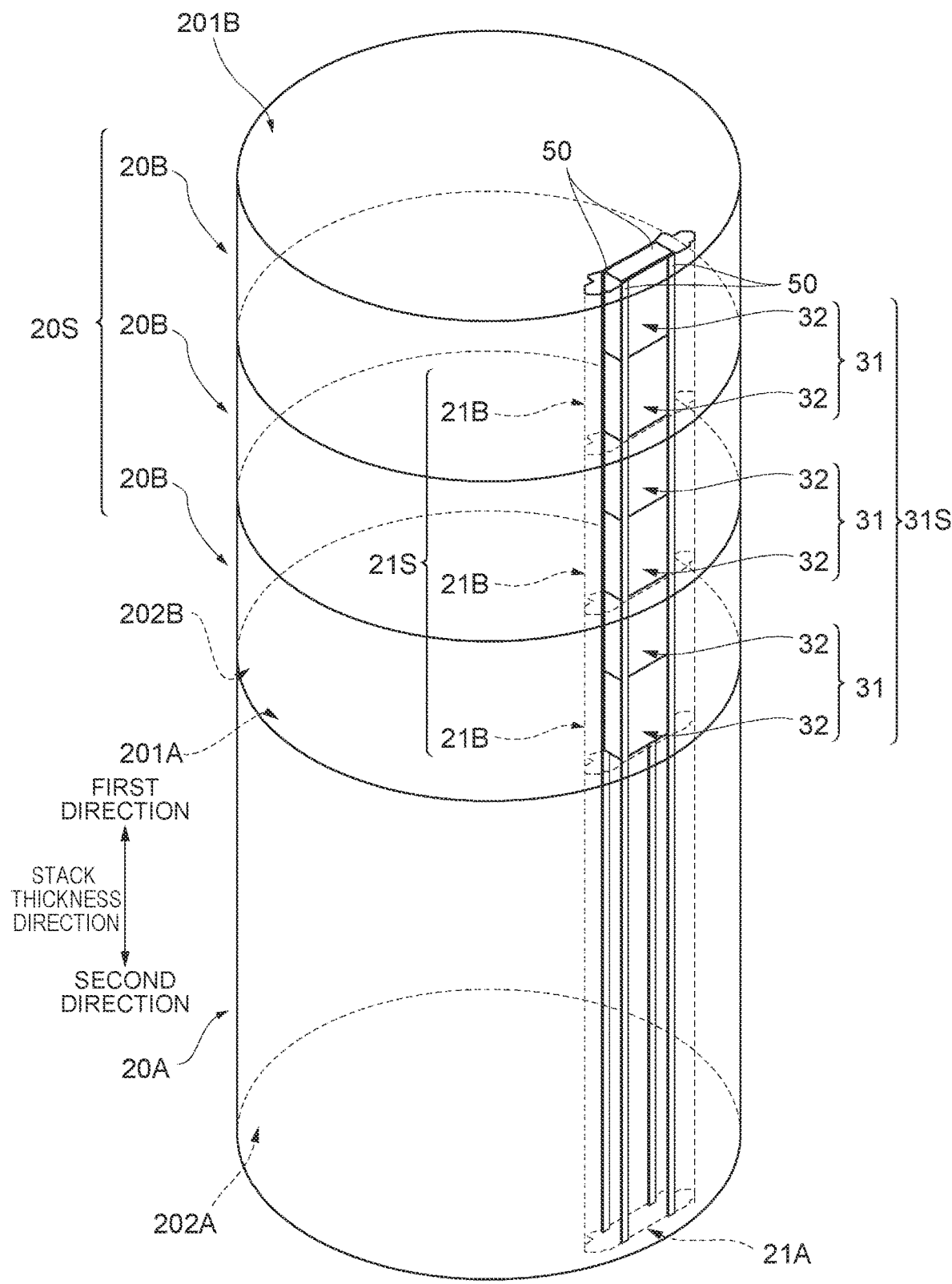
FIG. 16 is a view illustrating the rotor manufacturing method in detail in relation to step S20 of FIG. 15.
Figure 17:
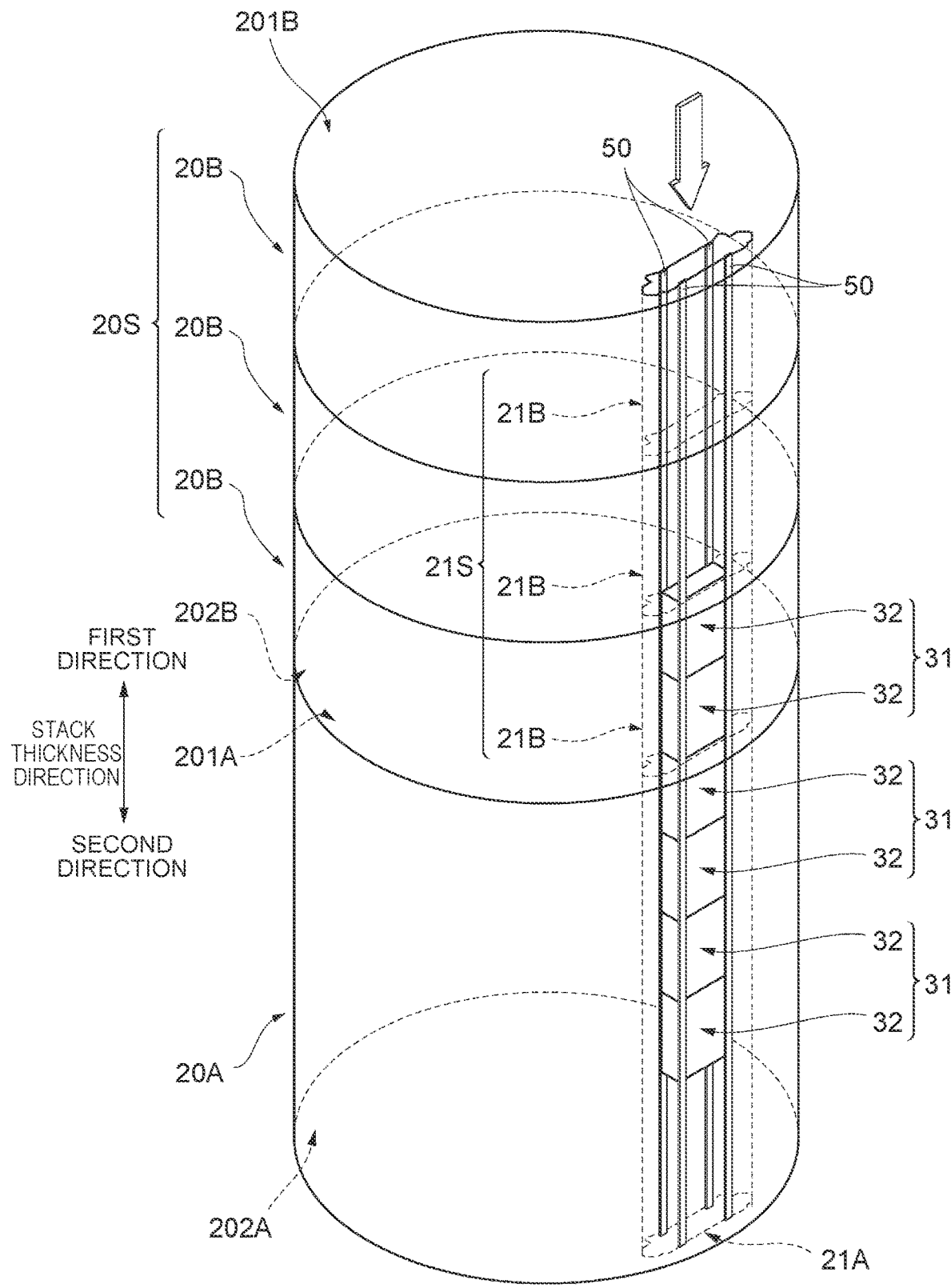
FIG. 17 is a view illustrating the rotor manufacturing method in detail in relation to step S30 of FIG. 15.
Figure 18:
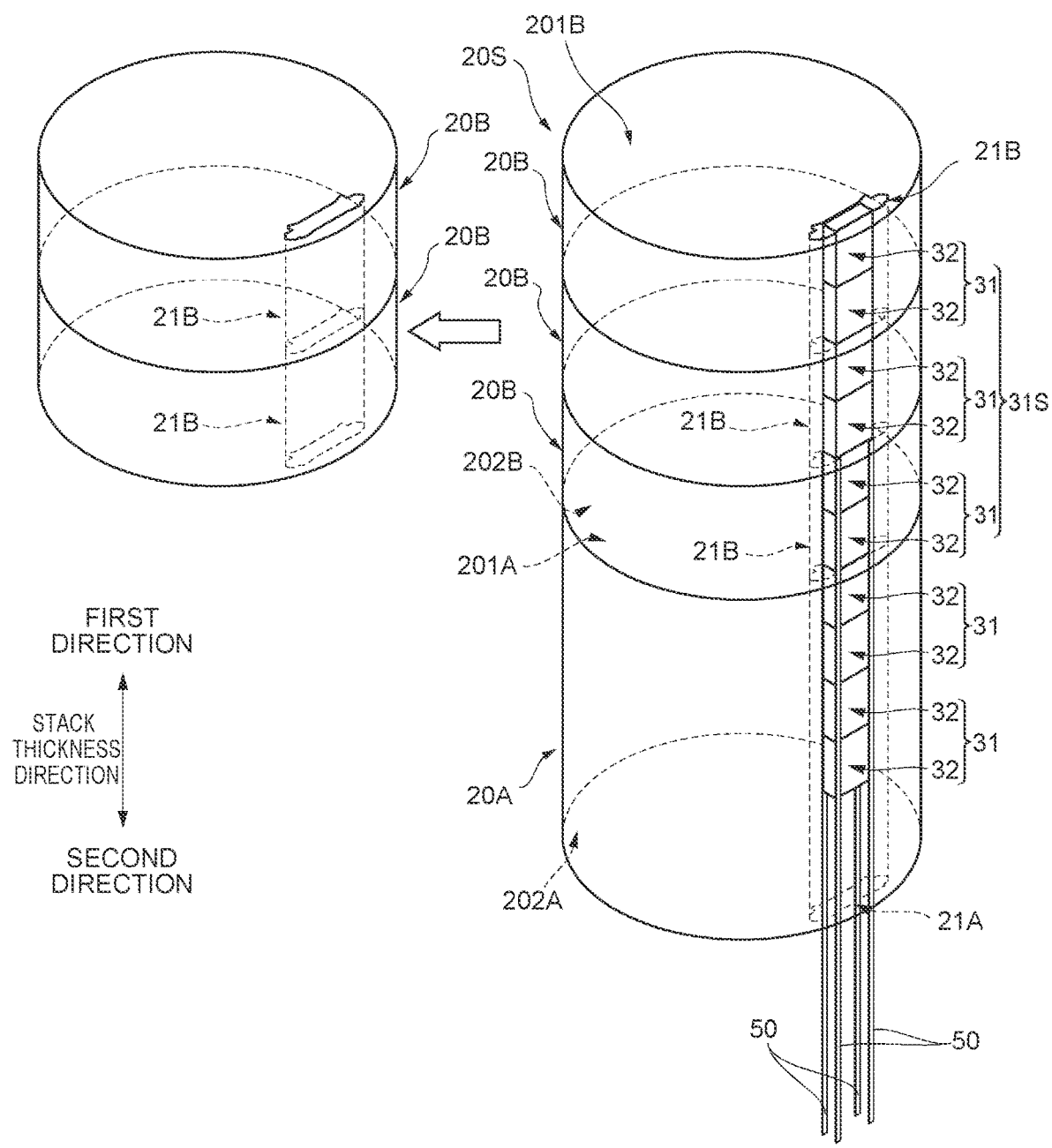
FIG. 18 is a view illustrating the rotor manufacturing method in detail in relation to step S40 of FIG. 15.
Figure 19:
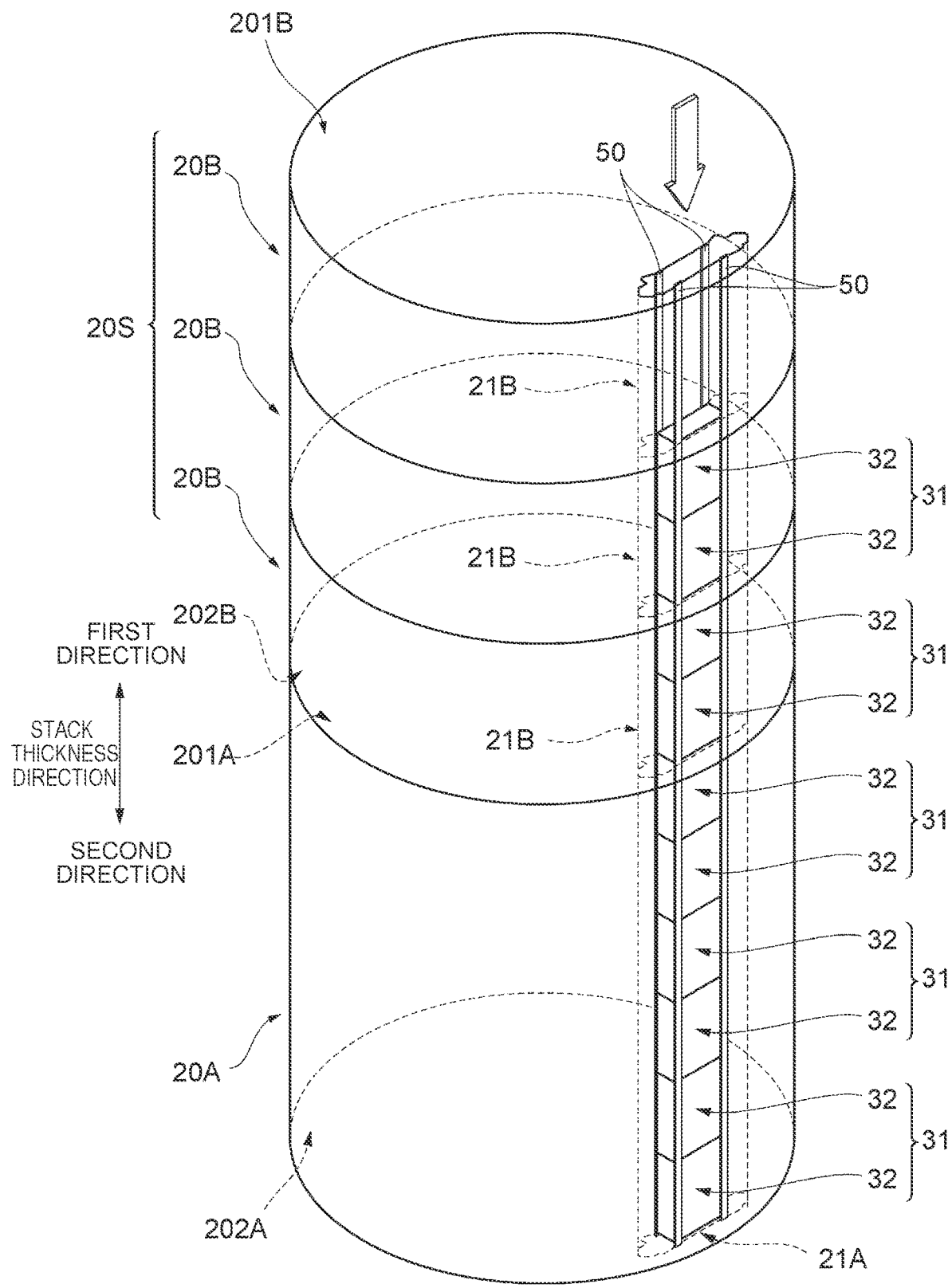
FIG. 19 is a view illustrating the rotor manufacturing method in detail in relation to step S50 of FIG. 15.

Next, a rotor manufacturing method according to a third embodiment will be described with reference to FIG. 15 to FIG. 19. FIG. 15 is a flowchart of the rotor manufacturing method according to the third embodiment. FIG. 16 is a view illustrating step S20 of FIG. 15. FIG. 17 is a view illustrating step S30 of FIG. 15. FIG. 18 is a view illustrating step S40 of FIG. 15. FIG. 19 is a view illustrating step S50 of FIG. 15. In FIG. 16 to FIG. 19, depiction of some of the magnet holes 21 is omitted. Further, in FIG. 16 to FIG. 19, the magnetized magnets 31 and the non-magnetic guide rails 50 are indicated by solid lines to make them easily visible.

First Rotor Core 20A and Second Rotor Core 20B

As shown in FIG. 16, the second stack thickness of the second rotor core 20B according to the third embodiment is half the second stack thickness of the second rotor core 20B according to the first embodiment. The first stack thickness of the first rotor core 20A according to the third embodiment is three times the second stack thickness of the second rotor core 20B according to the third embodiment. Therefore, the number of the magnet blocks 32 of the magnetized magnet 31 inserted in each second magnet hole 21B of the second rotor core 20B is a third of the number of the magnet blocks 32 that need to be inserted into each first magnet hole 21A of the first rotor core 20A.

Rotor Manufacturing Method

First, the first rotor core 20A and a second rotor core set 20S are prepared (S10).

To prepare the second rotor core set 20S, the second rotor core set 20S is formed by stacking three second rotor cores 20B in the stack thickness direction such that the second magnet holes 21B of the respective second rotor cores 20B overlap one another as shown in FIG. 16. On the other hand, preparation of the first rotor core 20A is the same as that in the first embodiment, and therefore the description thereof will be omitted.

Hereinafter, for the convenience of description, the overlapping second magnet holes 21B of the three second rotor cores 20B may be referred to as a "second magnet hole set 21S," and the three magnetized magnets 31 inserted in each second magnet hole set 21S may be referred to as a "magnetized magnet set 31S."

Next, the second rotor core set 20S is placed on the first rotor core 20A (S20).

Specifically, as shown in FIG. 16, the second rotor core set 20S is placed on the first end surface 201A, in the stack thickness direction, of the first rotor core 20A such that the second magnet hole sets 21S of the second rotor core set 20S respectively overlap the corresponding first magnet holes 21A of the first rotor core 20A.

Subsequently, the non-magnetic jig is installed on the second rotor core set 20S and the first rotor core 20A (S30).

The insertion method of the non-magnetic guide rails 50 according to step S30 is the same as that in the first embodiment, and therefore the description thereof will be omitted.

Next, using the non-magnetic jig, a part of the magnetized magnet set 31S in each second magnet hole set 21S is extruded toward the first magnet hole 21A (S40).

Specifically, the non-magnetic extruding part inserts a part of the magnetized magnet set 31S into the first magnet hole 21A of the first rotor core 20A along the non-magnetic guide rails 50. Further, as shown in FIG. 17, after the two second magnet holes 21B of the second rotor core set 20S that are located on the first direction side become empty, the action of the non-magnetic extruding part on the magnetized magnet set 31S is temporarily stopped.

Subsequently, the used second rotor cores 20B are replaced with new second rotor cores 20B (S50).

Step S50 is one example of a second rotor core replacing step. Specifically, as shown in FIG. 18, the non-magnetic adjusting part moves the four non-magnetic guide rails 50 in the second direction of the stack thickness direction so as not to interfere with the two second rotor cores 20B located on the first direction side. Then, the two second rotor cores 20B located on the first direction side can be taken out of the non-magnetic jig.

After the two second rotor cores 20B are taken out, two new second rotor cores 20B are placed on the side of the first end surface 201B of the second rotor core 20B that is placed on the first rotor core 20A, such that the second magnet holes 21B, to which the magnetized magnets 31 are inserted, of the respective two new second rotor cores 20B overlap the second magnet holes 21B of the second rotor core 20B that is placed on the first rotor core 20A. Thus, a new second rotor core set 20S is formed.

After the two second rotor cores 20B are replaced with new ones, as shown in FIG. 19, the non-magnetic adjusting part inserts and installs the non-magnetic guide rails 50 into each second magnet hole 21B of the two second rotor cores 20B located on the first direction side such that leading ends of the non-magnetic guide rails 50 on the first direction side reach the opening of the second magnet hole set 21S in the first end surface 201B. Specifically, for each second magnet hole 21B, two of the four non-magnetic guide rails 50 are inserted between the first main surface 311 of the magnetized magnet 31 and the second wall 211B, while the other two are inserted between the second main surface 312 of the magnetized magnet 31 and the second wall 212B.

Next, another part of each magnetized magnet set 31S is extruded toward the first magnet hole 21A using the non-magnetic jig (S60).

After the other half of the magnet blocks 32 in each second magnet hole 21B of the second rotor core 20B is inserted into the corresponding first magnet hole 21A of the first rotor core 20A, the non-magnetic adjusting part moves the non-magnetic guide rails 50 in the first direction of the stack thickness direction so as not to interfere with the first rotor core 20A.

Thereafter, the first rotor core 20A into which the needed magnet blocks 32 have been inserted is taken out of the non-magnetic jig, which completes insertion of magnets for the first rotor core 20A.

Advantages of Rotor Manufacturing Method

The rotor manufacturing method according to the third embodiment can offer the same advantages as the first embodiment, as well as can handle a first rotor core 20A and a second rotor core 20B that have different stack thicknesses. Thus, the rotor manufacturing method according to the third embodiment can be used for manufacture involving insertion of magnets into rotor cores of various stack thicknesses. This contributes to expanding the range of applications of the rotor manufacturing method according to the third embodiment.

For insertion of magnets into one first rotor core 10A, used second rotor cores 20B are replaced with new second rotor cores 20B. Thus, the number of the second rotor cores 20B to be used can be arbitrarily adjusted according to the number of magnet blocks that need to be inserted into the first rotor core 10A. This contributes to widening the applicability of the rotor manufacturing method according to the third embodiment.

When the second rotor cores 20B are replaced, the non-magnetic guide rails 50 of the non-magnetic jig are left installed in the second rotor core 20B that is not replaced and the first rotor core 20A. These non-magnetic guide rails 50 help position the new second rotor cores 20B relatively to the second rotor core 20B that is not replaced and the first rotor core 20A.

Fourth Embodiment

Figure 20:
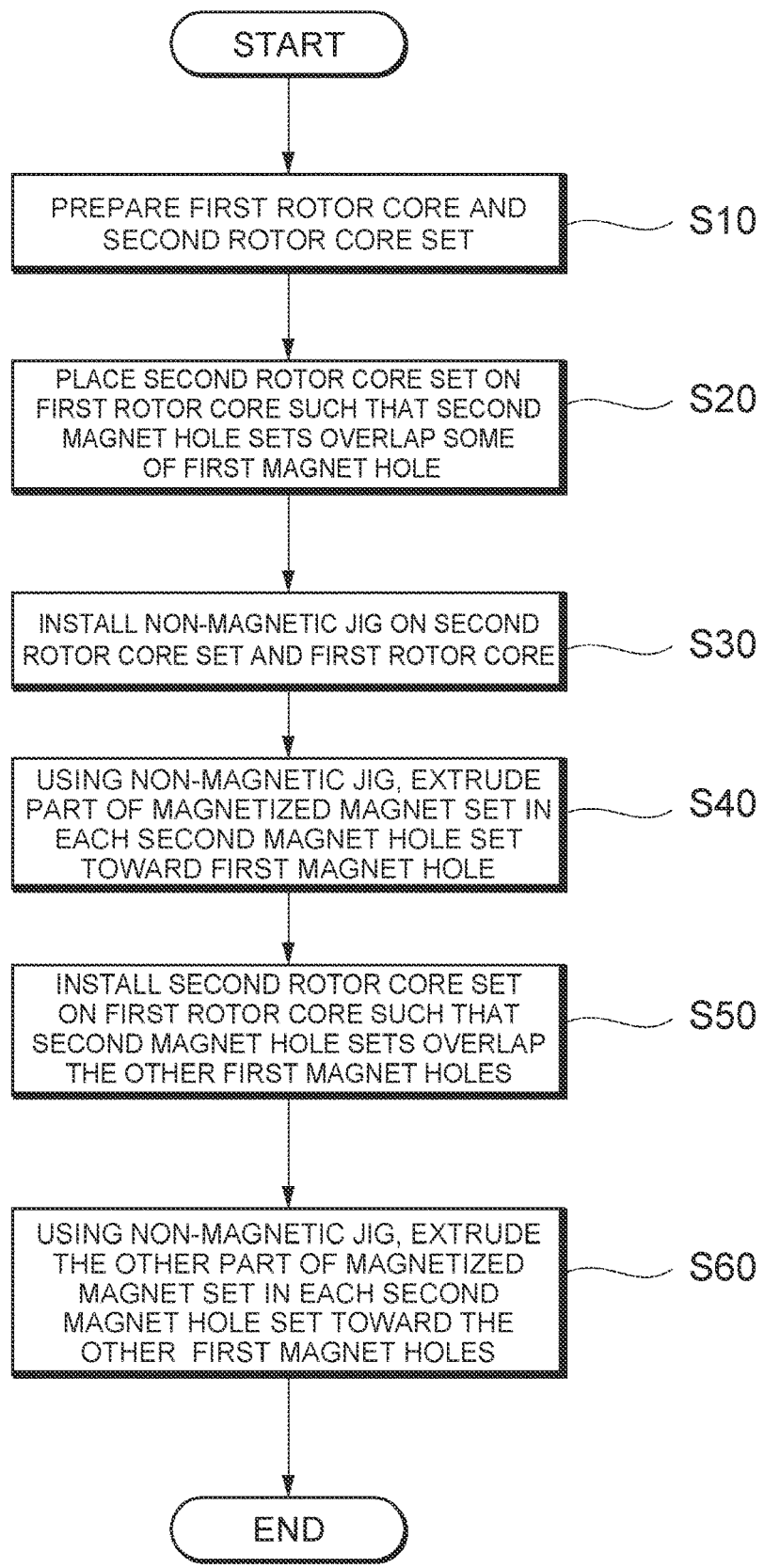
FIG. 20 is a flowchart of a rotor manufacturing method according to a fourth embodiment.
Figure 21:
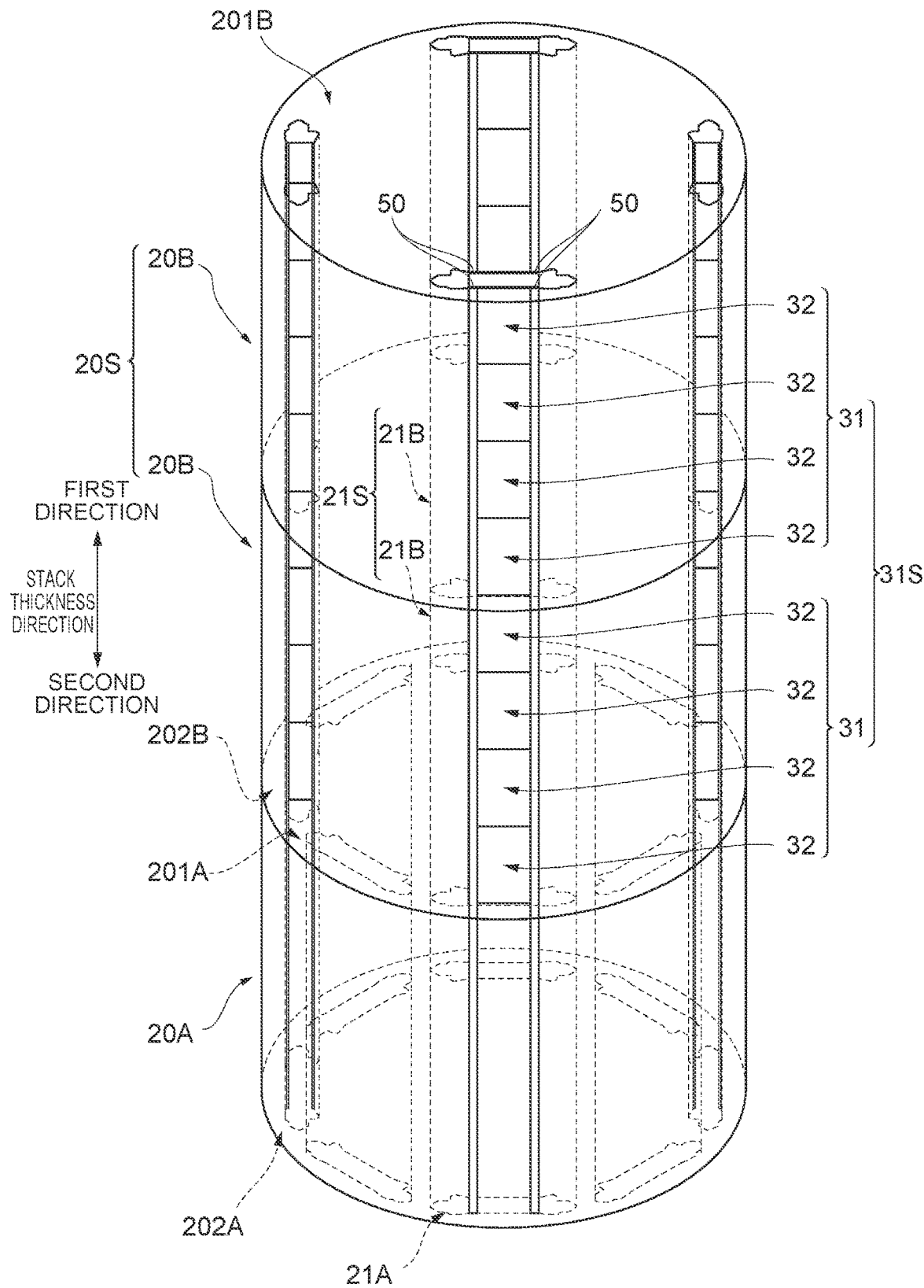
FIG. 21 is a view illustrating the rotor manufacturing method in detail in relation to step S20 of FIG. 20.
Figure 22:
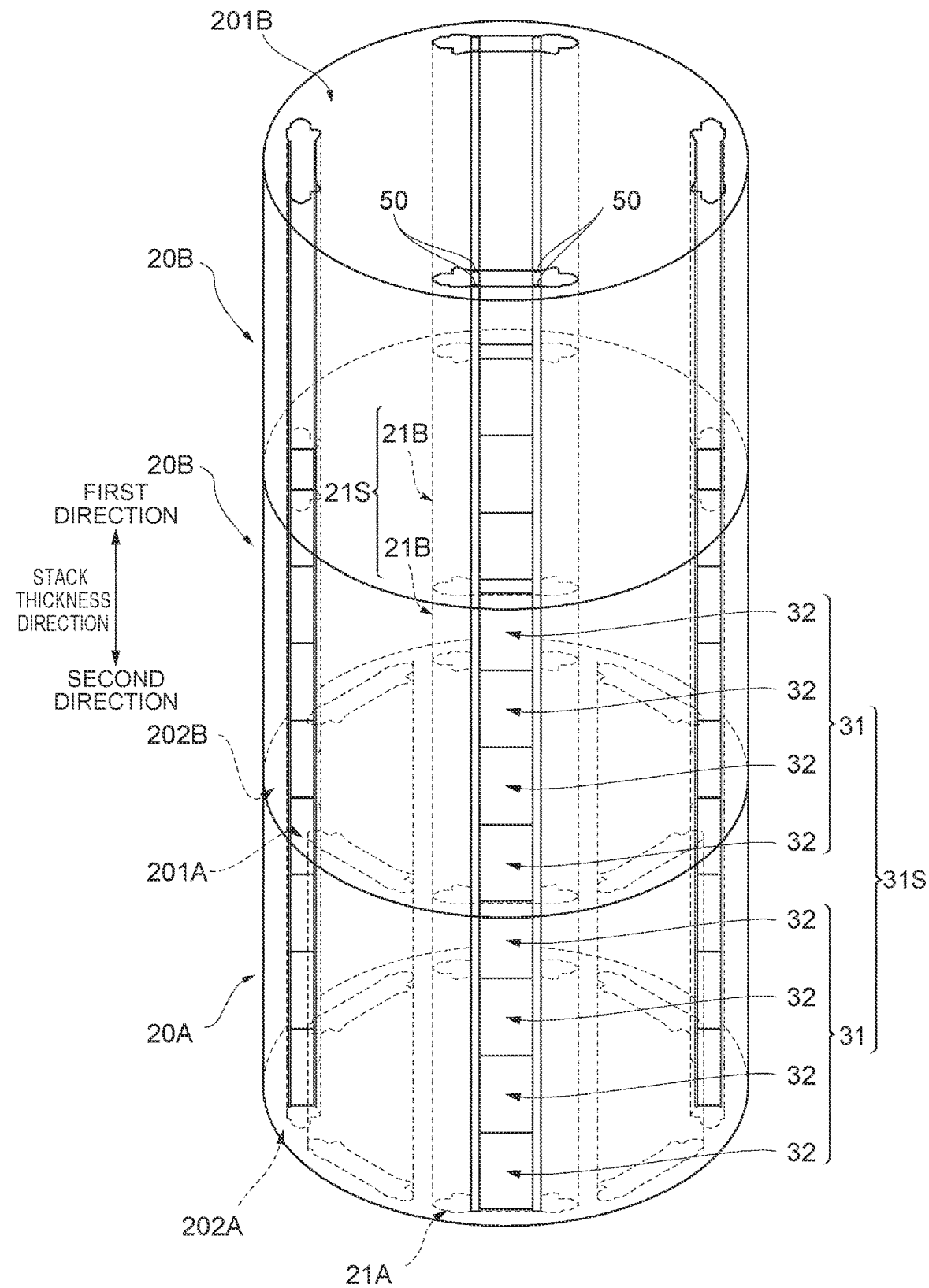
FIG. 22 is a view illustrating the rotor manufacturing method in detail in relation to step S30 of FIG. 20.
Figure 23:
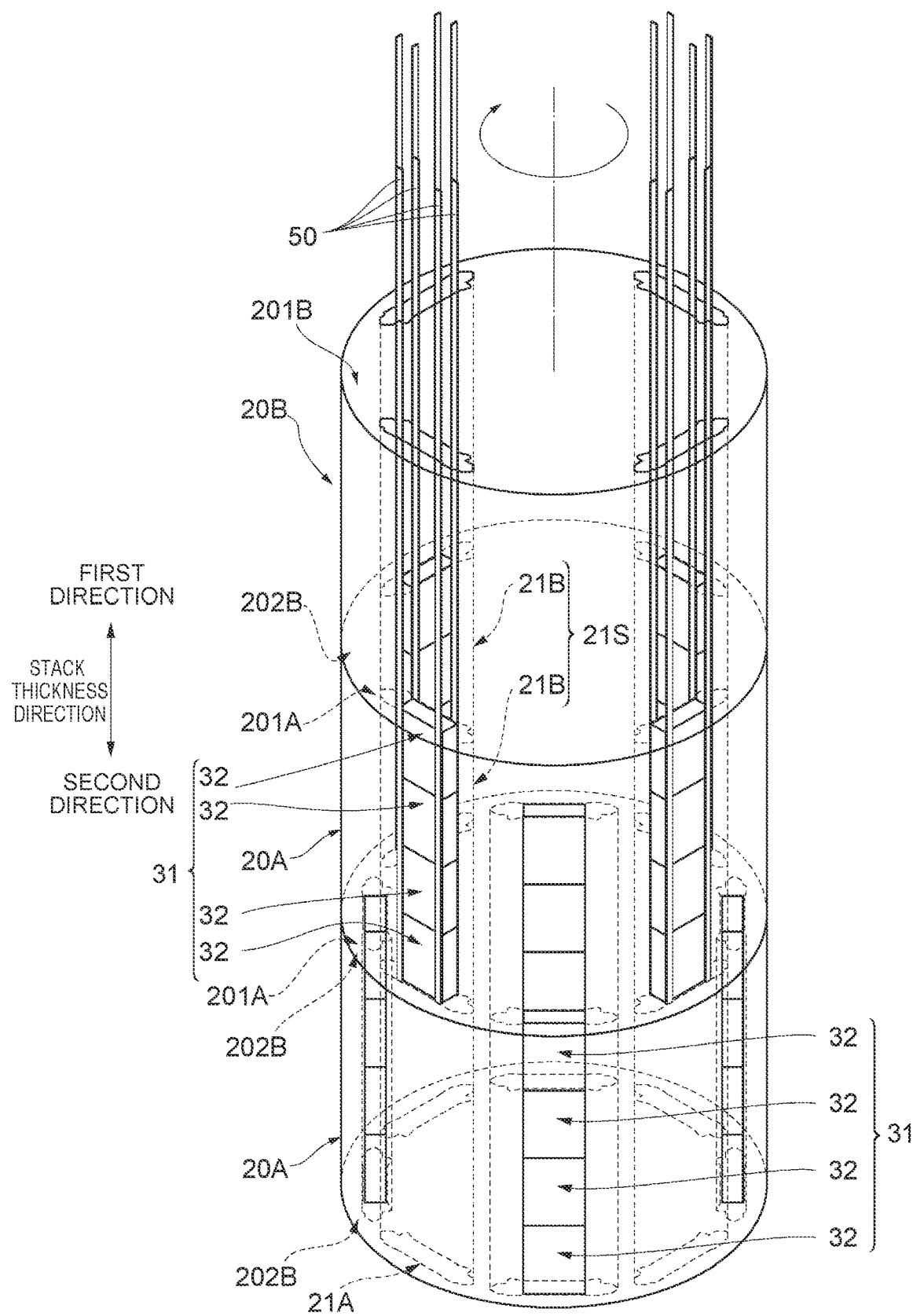
FIG. 23 is a view illustrating the rotor manufacturing method in detail in relation to step S40 of FIG. 20.
Figure 24:
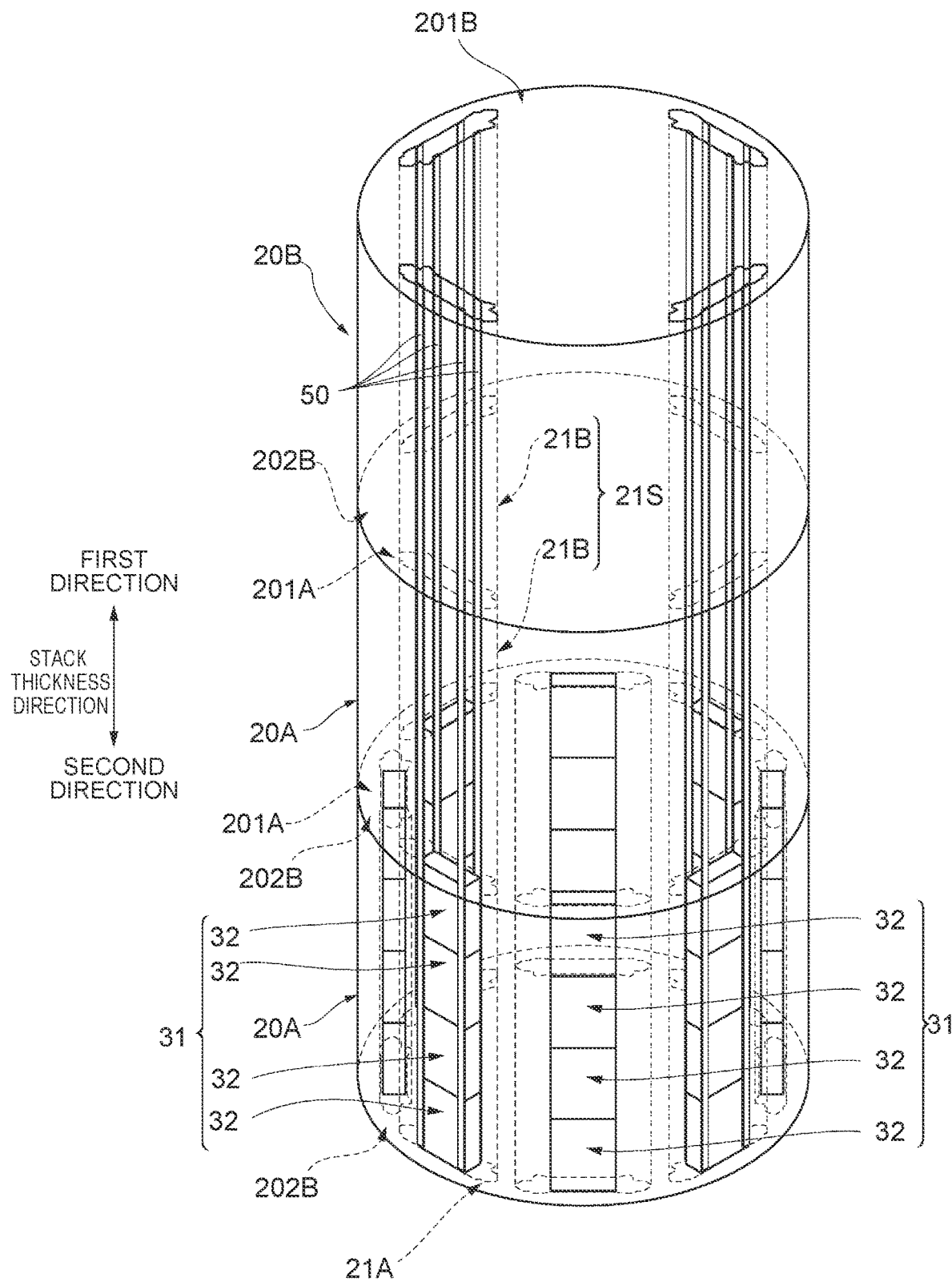
FIG. 24 is a view illustrating the rotor manufacturing method in detail in relation to step S50 of FIG. 20.

Next, a rotor manufacturing method according to a fourth embodiment will be described with reference to FIG. 20 to FIG. 24. FIG. 20 is a flowchart of the rotor manufacturing method according to the fourth embodiment. FIG. 21 is a view illustrating step S20 of FIG. 20. FIG. 22 is a view illustrating step S30 of FIG. 20. FIG. 23 is a view illustrating step S40 of FIG. 20. FIG. 24 is a view illustrating step S50 of FIG. 20. In FIG. 21 to FIG. 24, depiction of some of the magnet holes 21 is omitted. Further, in FIG. 21 to FIG. 24, the magnetized magnets 31 and the non-magnetic guide rails 50 are indicated by solid lines to make them easily visible.

First Rotor Core 20A and Second Rotor Core 20B

As shown in FIG. 21, the number of the second magnet holes 21B of each second rotor core 20B according to the fourth embodiment is half the number of the second magnet holes 21B of the second rotor core 20B according to the first embodiment. On the other hand, the configuration of the first rotor core 20A according to the fourth embodiment is the same as that of the first rotor core 20A according to the first embodiment. The second stack thickness of each second rotor core 20B according to the fourth embodiment is the same as the first stack thickness of the first rotor core 20A according to the fourth embodiment.

Rotor Manufacturing Method

First, the first rotor core 20A and the second rotor core set 20S are prepared (S10).

Preparation of the second rotor core set 20S according to the fourth embodiment is the same as that in step S10 of the third embodiment, and therefore the description thereof will be omitted.

Next, the second rotor core set 20S is placed on the first rotor core 20A such that the second magnet hole sets 21S of the second rotor core set 20S overlap some of the first magnet holes 21A (S20).

Step S20 is one example of a first placing step. Here, the number of the second magnet hole sets 21S of the second rotor core set 20S is half the number of the first magnet holes 21A of the first rotor core 20A. Therefore, as shown in FIG. 21, first, the second rotor core set 20S is placed on the first end surface 201A of the first rotor core 20A such that the second magnet hole sets 21S of the second rotor core set 20S respectively overlap the corresponding half of the first magnet holes 21A of the first rotor core 20A.

Subsequently, the non-magnetic jig is installed on the second rotor core set 20S and the first rotor core 20A (S30).

The installation method in step S30 according to the fourth embodiment is the same as that in step S30 of the third embodiment, and therefore the description thereof will be omitted.

Next, a part of the magnetized magnet set 31S in each second magnet hole set 21S is extruded toward the first magnet hole 21A using the non-magnetic jig (S40).

Step S40 is one example of a first extruding step. The extrusion method in step S40 according to the fourth embodiment is the same as that in step S40 of the third embodiment, and therefore the description thereof will be omitted.

Subsequently, the second rotor core set 20S is placed on the first rotor core 20A such that the second magnet hole sets 21S of the second rotor core set 20S overlap others of the first magnet holes 21A (S50).

Step S50 is one example of a second placing step. Specifically, as shown in FIG. 23, first, the non-magnetic adjusting part moves the non-magnetic guide rails 50 in the first direction of the stack thickness direction so as not to interfere with the first rotor core 20A. Then, the second rotor core set 20S can be moved or rotated relatively to the first rotor core 20A. Thus, as shown in FIG. 23, the second rotor core set 20S is rotated and installed on the first end surface 201A of the first rotor core 20A such that the second magnet hole sets 21S of the second rotor core set 20S overlap the other half of the first magnet holes 21A.

After the second rotor core set 20S is installed, as shown in FIG. 24, the non-magnetic adjusting part inserts and installs the non-magnetic guide rails 50 into each first magnet hole 21A of the first rotor core 20A such that the leading ends of the non-magnetic guide rails 50 on the insertion side reach the opening of the first magnet hole 21A in the second end surface 202A.

Next, another part of the magnetized magnet set 31S in each second magnet hole set 21S is extruded toward the first magnet hole 21A using the non-magnetic jig (S60).

Step S60 is one example of a second extruding step. Specifically, as shown in FIG. 24, the part of the magnetized magnet set 31S remaining in each second magnet hole set 21S is extruded toward the first magnet hole 21A along the non-magnetic guide rails 50. The extrusion method in step S40 according to the fourth embodiment is the same as that in step S40 of the third embodiment, and therefore the description thereof will be omitted.

After the other half of the magnet blocks 32 inserted in each second magnet hole 21B of the second rotor core 20B is inserted into the corresponding first magnet hole 21A of the first rotor core 20A, the non-magnetic adjusting part moves the four non-magnetic guide rails 50 in the first direction of the stack thickness direction so as not to interfere with the first rotor core 20A.

Thereafter, the first rotor core 20A into which the needed magnet blocks 32 have been inserted is taken out of the non-magnetic jig, which completes insertion of magnets for the first rotor core 20A.

Advantages of Rotor Manufacturing Method

The rotor manufacturing method according to the fourth embodiment can offer the same advantages as the first embodiment, as well as can handle a first rotor core 20A and a second rotor core 20B that have different numbers of magnet holes. This contributes to expanding the range of applications of the rotor manufacturing method according to the fourth embodiment.

For one first rotor core 20A, the magnet blocks of the same second rotor core set 20S can be inserted into all the first magnet holes 21A of the first rotor core 20A in a few batches. Thus, the magnetized magnets 31 in the second rotor core set 20S can be efficiently reused. This contributes to increasing the manufacturing efficiency of the rotor manufacturing method according to the fourth embodiment.

The embodiments having been described above are intended to facilitate understanding of the present disclosure and not to limit the interpretation of the present disclosure. The elements included in the embodiments and the arrangement, materials, conditions, shapes, sizes, etc. of these elements are not limited to those illustrated but can be changed as necessary. Further, some of the components shown in one embodiment may be exchanged or combined with some of the components shown in another embodiment.

What is claimed is:

1. A rotor manufacturing method that allows magnetized magnets inserted in second magnet holes of a second rotor core to be inserted, while retaining magnetism, into first magnet holes of a first rotor core in which magnetized magnets are not inserted, the method comprising:
    a placing step of placing the second rotor core on a first end surface, in a stack thickness direction, of the first rotor core such that the second magnet holes overlap the first magnet holes; and
    an extruding step of extruding the magnetized magnets from the second magnet holes toward the first magnet holes using a non-magnetic jig, wherein
    the non-magnetic jig has non-magnetic guide rails,
    before the extruding step is performed, the magnetized magnet in each of the second magnet holes is attracted to a second wall of the second magnet hole and in contact with the second wall, and
    the extruding step includes
        inserting and installing the non-magnetic guide rails between the second wall and the magnetized magnet in contact with the second wall so as to keep the second wall and the magnetized magnet in the second magnet hole from coming into contact with each other, and
        extruding the magnetized magnet that is no longer in contact with the second wall toward the first magnet hole along the non-magnetic guide rails.

2. The rotor manufacturing method according to claim 1, wherein inserting and installing the non-magnetic guide rails includes inserting the non-magnetic guide rails into the second magnet hole, or into the second magnet hole and the first magnet hole, such that leading ends of the non-magnetic guide rails on an insertion side pass through the second magnet hole and reach an opening of the first magnet hole in the first end surface or reach into the first magnet hole.

3. The rotor manufacturing method according to claim 1, wherein:
    in a placed state where the second rotor core is placed on the first rotor core, the first rotor core has at least the first magnet holes that are formed at positions corresponding to positions in the second rotor core at which the second magnet holes are formed;
    a shape of the first magnet holes as seen in plan view is the same as a shape of the second magnet holes as seen in plan view or larger than the shape of the second magnet holes as seen in plan view; and
    the placing step includes placing one or more second rotor cores on the first end surface of the first rotor core such that the second magnet holes overlap the first magnet holes corresponding to the second magnet holes.

4. The rotor manufacturing method according to claim 3, wherein, when a plurality of second rotor cores is placed on the first rotor core in the placing step, the placing step includes stacking the second rotor cores such that the second magnet holes of the respective second rotor cores overlap one another, and thus forming a second rotor core set having second magnet hole sets that extend in a stack thickness direction, and the extruding step includes inserting and installing the non-magnetic guide rails of the non-magnetic jig into each of the second magnet hole sets such that leading ends of the non-magnetic guide rails on an insertion side pass through the second magnet hole set and reach an opening of the first magnet hole in the first end surface or reach into the first magnet hole.

5. The rotor manufacturing method according to claim 4, wherein, when a plurality of magnetized magnets needs to be inserted according to a first stack thickness of the first rotor core, the extruding step includes extruding the magnetized magnets in the second magnet holes of required ones of the second rotor cores in the second rotor core set toward the first magnet holes of the first rotor core along the non-magnetic guide rails.

6. The rotor manufacturing method according to claim 4, wherein, when the number of the second magnet holes is smaller than the number of the first magnet holes, the placing step includes a first placing step of placing the second rotor core set on the first end surface, in a stack thickness direction, of the first rotor core such that the second magnet hole sets of the second rotor core set overlap some of the first magnet holes that correspond to the second magnet hole sets, and a second placing step of placing the second rotor core set on the first end surface, in the stack thickness direction, of the first rotor core such that the second magnet hole sets of the second rotor core set overlap others of the first magnet holes, the extruding step includes a first extruding step of extruding a part of the magnetized magnet in each of the second magnet hole sets toward a corresponding one among some of the first magnet holes along the non-magnetic guide rails, and a second extruding step of extruding another part of the magnetized magnet in each of the second magnet hole sets toward a corresponding one among others of the first magnet holes along the non-magnetic guide rails, and the first placing step, the second placing step, the first extruding step, and the second extruding step are performed in order of the first placing step, the first extruding step, the second placing step, and the second extruding step.

7. The rotor manufacturing method according to claim 3, wherein:

the magnetized magnet in each of the second magnet holes is divided into a plurality of magnet blocks in a stack thickness direction; and the extruding step includes extruding, into the first magnet hole, some or all of the magnet blocks in each of the second magnet holes of the respective ones of one or more second rotor cores according to a first stack thickness of the first rotor core.

8. The rotor manufacturing method according to claim 7, wherein, when the first stack thickness of the first rotor core is equal to a second stack thickness of the second rotor core or smaller than the second stack thickness, the extruding step includes extruding, into the first magnet hole, all or some of the magnet blocks in each of the second magnet holes of one second rotor core according to the first stack thickness.

9. The rotor manufacturing method according to claim 7, wherein, when the first stack thickness of the first rotor core is larger than a second stack thickness of the second rotor core, the extruding step includes extruding, into the first magnet hole, all or some of the magnet blocks in each of the second magnet holes of the respective ones of a plurality of second rotor cores according to the first stack thickness.

10. The rotor manufacturing method according to claim 1, further comprising, after inserting needed magnetized magnets into the first magnet holes of the first rotor core by the extruding step, a first rotor core replacing step of replacing the first rotor core for which insertion of magnets has been completed with another first rotor core in which magnetized magnets are not inserted, wherein:

the first rotor core replacing step includes installing the other first rotor core on a second end surface of the second rotor core such that first magnet holes of the other first rotor core overlap the second magnet holes of the second rotor core; and the extruding step is performed again after the first rotor core replacing step is performed.

11. The rotor manufacturing method according to claim 10, wherein the first rotor core replacing step includes:

before installing the other first rotor core on the second rotor core, moving the non-magnetic guide rails in a stack thickness direction so as not to interfere with the first rotor core for which insertion of magnets has been completed, and then taking out the first rotor core; and after installing the other first rotor core on the second rotor core, moving the non-magnetic guide rails in the stack thickness direction and inserting the non-magnetic guide rails into the first magnet holes of the other first rotor core.

12. The rotor manufacturing method according to claim 1, further comprising, after extruding the magnetized magnets in the second magnet holes of the second rotor core by the extruding step to empty the second magnet holes, a second rotor core replacing step of replacing the used second rotor core of which the second magnet holes have become empty with another second rotor core in which magnetized magnets are inserted, wherein:

the second rotor core replacing step includes installing the other second rotor core on a first end surface side of the first rotor core such that second magnet holes of the other second rotor core overlap the first magnet holes of the first rotor core; and the extruding step is performed again after the second rotor core replacing step is performed.

13. The rotor manufacturing method according to claim 12, wherein the second rotor core replacing step includes:

before installing the other second rotor core on the first rotor core, moving the non-magnetic guide rails in a stack thickness direction so as not to interfere with the used second rotor core, and then taking out the used second rotor core; and after installing the other second rotor core on the first rotor core, moving the non-magnetic guide rails in the stack thickness direction and inserting the non-magnetic guide rails into the second magnet holes so as to keep the magnetized magnet inserted in each of the second magnet holes of the other second rotor core and the second wall of the second magnet hole from coming into contact with each other.

\* \* \* \* \*